(12) United States Patent
Klose

(10) Patent No.: US 11,321,189 B2
(45) Date of Patent: *May 3, 2022

(54) INFORMATION MANAGEMENT BY A MEDIA AGENT IN THE ABSENCE OF COMMUNICATIONS WITH A STORAGE MANAGER

(71) Applicant: Commvault Systems, Inc., Tinton Falls, NJ (US)

(72) Inventor: Michael Frank Klose, San Jose, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/065,736

(22) Filed: Oct. 8, 2020

(65) Prior Publication Data
US 2021/0026741 A1    Jan. 28, 2021

Related U.S. Application Data

(63) Continuation of application No. 15/990,012, filed on May 25, 2018, now Pat. No. 10,838,824, which is a
(Continued)

(51) Int. Cl.
*G06F 7/00* (2006.01)
*G06F 11/14* (2006.01)
(Continued)

(52) U.S. Cl.
CPC ............ *G06F 11/1464* (2013.01); *G06F 3/06* (2013.01); *G06F 3/0635* (2013.01);
(Continued)

(58) Field of Classification Search
CPC ...... G06F 16/164; G06F 11/00; G06F 11/201; G06F 11/2094; G06F 2201/80;
(Continued)

(56) References Cited

U.S. PATENT DOCUMENTS 4,084,231 A    4/1978 Capozzi
4,267,568 A    5/1981 Dechant et al.
(Continued)

FOREIGN PATENT DOCUMENTS

AU    2004227949    10/2004
CA    2498174    3/2004
(Continued)

OTHER PUBLICATIONS

Bhagwat et al., "Extreme Binning: Scalable, Parallel Deduplication for Chunk-based File Backup", IEEE International Symposium on Modeling, Analysis & Simulation of Computer and Telecommunication Systems, Sep. 2009, pp. 1-9.
(Continued)

*Primary Examiner* — Mohammed R Uddin
(74) *Attorney, Agent, or Firm* — Commvault Systems, Inc.

(57) ABSTRACT

A media agent is configured to perform substantially autonomously to initiate, continue, and manage information management operations such as a backup job of a certain client's primary data, manage the operations, and generate and store resultant system-level metadata from the operations, etc. The media agent is configured to do this even when out of communication with the storage manager that manages the information management system. When communications are restored, the media agent reports the relevant metadata to the storage manager. The storage manager comprises corresponding enhancements, including specialized logic for identifying the media agent as an intelligent media agent capable of some autonomous functionality, for transmitting management parameters thereto, and for seamlessly integrating the received metadata into the storage manager's associated management infrastructure such as a management database.

20 Claims, 12 Drawing Sheets

Related U.S. Application Data continuation of application No. 15/377,837, filed on Dec. 13, 2016, now Pat. No. 10,013,314, which is a continuation of application No. 14/271,311, filed on May 6, 2014, now Pat. No. 9,563,518.

(60) Provisional application No. 61/974,181, filed on Apr. 2, 2014.

(51) Int. Cl.
| | | |
|---|---|---|
| *G06F 16/11* | (2019.01) | |
| *G06F 16/16* | (2019.01) | |
| *G06F 3/06* | (2006.01) | |
| *G06F 11/20* | (2006.01) | |
| *G06F 11/00* | (2006.01) | |

(52) U.S. Cl.
CPC ........ *G06F 11/1456* (2013.01); *G06F 16/113* (2019.01); *G06F 16/164* (2019.01); *G06F 11/00* (2013.01); *G06F 11/201* (2013.01); *G06F 11/2094* (2013.01); *G06F 2201/80* (2013.01); *G06F 2201/84* (2013.01)

(58) Field of Classification Search
CPC .... G06F 2201/84; G06F 11/1464; G06F 3/06; G06F 3/0635; G06F 11/1456; G06F 16/113
See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau |
| 5,420,996 A | 5/1995 | Aoyagi |
| 5,448,724 A | 9/1995 | Hayashi |
| 5,454,099 A | 9/1995 | Myers et al. |
| 5,481,694 A | 1/1996 | Chao et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,544,359 A | 8/1996 | Tada et al. |
| 5,548,750 A | 8/1996 | Larsson et al. |
| 5,559,957 A | 9/1996 | Balk |
| 5,559,991 A | 9/1996 | Kanfi |
| 5,594,901 A | 1/1997 | Andoh |
| 5,619,644 A | 4/1997 | Crockett et al. |
| 5,638,509 A | 6/1997 | Dunphy et al. |
| 5,640,561 A | 6/1997 | Satoh et al. |
| 5,642,496 A | 6/1997 | Kanfi |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,793,867 A | 8/1998 | Cordery et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,930,831 A | 7/1999 | Marsh et al. |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,078,932 A | 6/2000 | Haye et al. |
| 6,094,416 A | 7/2000 | Ying |
| 6,101,585 A | 8/2000 | Brown et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,175,904 B1 | 1/2001 | Gunderson |
| 6,185,474 B1 | 2/2001 | Nakamura et al. |
| 6,199,074 B1 | 3/2001 | Kern et al. |
| 6,212,512 B1 | 4/2001 | Barney et al. |
| 6,230,166 B1 | 5/2001 | Velamuri et al. |
| 6,260,069 B1 | 7/2001 | Anglin |
| 6,269,431 B1 | 7/2001 | Dunham |
| 6,272,631 B1 | 8/2001 | Thomlinson et al. |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,397,242 B1 | 5/2002 | Devine et al. |
| 6,415,323 B1 | 7/2002 | McCanne et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,516,327 B1 | 2/2003 | Zondervan et al. |
| 6,519,679 B2 | 2/2003 | Devireddy et al. |
| 6,538,669 B1 | 3/2003 | Lagueux, Jr |
| 6,542,972 B2 | 4/2003 | Ignatius et al. |
| 6,564,228 B1 | 5/2003 | O'Connor |
| 6,581,076 B1 | 6/2003 | Ching et al. |
| 6,658,436 B2 | 12/2003 | Osh et al. |
| 6,658,526 B2 | 12/2003 | Nguyen et al. |
| 6,704,839 B2 | 3/2004 | Butterworth et al. |
| 6,704,885 B1 | 3/2004 | Salas-Meza et al. |
| 6,721,767 B2 | 4/2004 | De Meno et al. |
| 6,732,124 B1 | 5/2004 | Koseki et al. |
| 6,760,723 B2 | 7/2004 | Oshinsky et al. |
| 6,769,003 B2 | 7/2004 | Park et al. |
| 6,772,290 B1 | 8/2004 | Bromley et al. |
| 6,795,904 B1 | 9/2004 | Kamvysselis |
| 6,820,214 B1 | 11/2004 | Cabrera et al. |
| 6,836,830 B1 | 12/2004 | Yamagami et al. |
| 6,839,747 B1 | 1/2005 | Blumenau et al. |
| 6,880,101 B2 | 4/2005 | Golasky et al. |
| 7,003,641 B2 | 2/2006 | Prahlad et al. |
| 7,035,880 B1 | 4/2006 | Crescent et al. |
| 7,065,537 B2 | 6/2006 | Cha et al. |

(56) References Cited

U.S. PATENT DOCUMENTS

| | | |
|---|---|---|
| 7,076,270 B2 | 7/2006 | Jaggers et al. |
| 7,082,464 B2 | 7/2006 | Hasan et al. |
| 7,100,007 B2 | 8/2006 | Saika |
| 7,103,432 B2 | 9/2006 | Drader et al. |
| 7,107,298 B2 | 9/2006 | Prahlad et al. |
| 7,130,970 B2 | 10/2006 | Devassy et al. |
| 7,143,121 B2 | 11/2006 | Mendonca et al. |
| 7,162,496 B2 | 1/2007 | Amarendran et al. |
| 7,174,433 B2 | 2/2007 | Kottomtharayil et al. |
| 7,178,059 B2 | 2/2007 | Greenspan et al. |
| 7,209,972 B1 | 4/2007 | Ignatius et al. |
| 7,219,162 B2 | 5/2007 | Donker et al. |
| 7,234,073 B1 | 6/2007 | Roytman et al. |
| 7,246,207 B2 | 7/2007 | Kottomtharayil et al. |
| 7,249,150 B1 | 7/2007 | Watanabe et al. |
| 7,315,923 B2 | 1/2008 | Retnamma et al. |
| 7,315,924 B2 | 1/2008 | Prahlad et al. |
| 7,318,134 B1 | 1/2008 | Oliveira et al. |
| 7,324,543 B2 | 1/2008 | Wassew et al. |
| 7,343,356 B2 | 3/2008 | Prahlad et al. |
| 7,343,453 B2 | 3/2008 | Prahlad et al. |
| 7,346,623 B2 | 3/2008 | Prahlad et al. |
| 7,346,751 B2 | 3/2008 | Prahlad et al. |
| 7,376,895 B2 | 5/2008 | Tsao |
| 7,380,072 B2 | 5/2008 | Kottomtharayil et al. |
| 7,380,155 B2 | 5/2008 | Fung et al. |
| 7,383,293 B2 | 6/2008 | Gupta et al. |
| 7,386,744 B2 | 6/2008 | Barr et al. |
| 7,389,311 B1 | 6/2008 | Crescent et al. |
| 7,395,282 B1 | 7/2008 | Crescent et al. |
| 7,401,154 B2 | 7/2008 | Ignatius et al. |
| 7,409,509 B2 | 8/2008 | Devassy et al. |
| 7,424,519 B2 | 9/2008 | Hoshino et al. |
| 7,437,388 B1 | 10/2008 | DeVos |
| 7,440,982 B2 | 10/2008 | Lu et al. |
| 7,447,692 B2 | 11/2008 | Oshinsky et al. |
| 7,448,079 B2 | 11/2008 | Tremain |
| 7,454,569 B2 | 11/2008 | Kavuri et al. |
| 7,475,282 B2 | 1/2009 | Tormasov et al. |
| 7,484,054 B2 | 1/2009 | Kottomtharayil et al. |
| 7,484,208 B1 | 1/2009 | Nelson |
| 7,490,207 B2 | 2/2009 | Amarendran |
| 7,500,053 B1 | 3/2009 | Kavuri et al. |
| 7,502,820 B2 | 3/2009 | Manders et al. |
| 7,512,595 B1 | 3/2009 | McBride et al. |
| 7,529,782 B2 | 5/2009 | Prahiad et al. |
| 7,536,291 B1 | 5/2009 | Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,546,484 B2 | 6/2009 | Sen et al. |
| 7,552,279 B1 | 6/2009 | Gandler |
| 7,568,080 B2 | 7/2009 | Prahlad et al. |
| 7,581,077 B2 | 8/2009 | Ignatius et al. |
| 7,594,138 B2 | 9/2009 | Abdulvahid |
| 7,596,721 B1 | 9/2009 | Flake et al. |
| 7,600,125 B1 | 10/2009 | Stringham |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,617,307 B2 | 11/2009 | Childress et al. |
| 7,620,710 B2 | 11/2009 | Kottomtharayil et al. |
| 7,631,351 B2 | 12/2009 | Erofeev |
| 7,636,743 B2 | 12/2009 | Erofeev |
| 7,640,406 B1 | 12/2009 | Hagerstrom et al. |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,668,884 B2 | 2/2010 | Prahlad et al. |
| 7,685,177 B1 | 3/2010 | Hagerstrom et al. |
| 7,694,070 B2 | 4/2010 | Mogi et al. |
| 7,702,782 B1 | 4/2010 | Pai |
| 7,707,184 B1 | 4/2010 | Zhang et al. |
| 7,707,190 B2 | 4/2010 | Yu et al. |
| 7,721,138 B1 | 5/2010 | Lyadvinsky et al. |
| 7,725,893 B2 | 5/2010 | Jaeckel et al. |
| 7,730,035 B2 | 6/2010 | Berger et al. |
| 7,734,578 B2 | 6/2010 | Prahlad et al. |
| 7,734,669 B2 | 6/2010 | Kottomtharayil et al. |
| 7,739,459 B2 | 6/2010 | Kottomtharayil et al. |
| 7,747,579 B2 | 6/2010 | Prahlad et al. |
| 7,756,835 B2 | 7/2010 | Pugh |
| 7,756,964 B2 | 7/2010 | Madison, Jr. et al. |
| 7,757,043 B2 | 7/2010 | Kavuri et al. |
| 7,765,167 B2 | 7/2010 | Prahlad et al. |
| 7,769,961 B2 | 8/2010 | Kottomtharayil et al. |
| 7,778,984 B2 | 8/2010 | Zhang et al. |
| 7,792,789 B2 | 9/2010 | Prahlad et al. |
| 7,793,307 B2 | 9/2010 | Gokhale et al. |
| 7,797,281 B1 | 9/2010 | Greene et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 7,822,717 B2 | 10/2010 | Kapoor et al. |
| 7,822,939 B1 | 10/2010 | Veprinsky et al. |
| 7,822,967 B2 | 10/2010 | Fung |
| 7,840,537 B2 | 11/2010 | Gokhale |
| 7,861,234 B1 | 12/2010 | Lolo |
| 7,882,077 B2 | 2/2011 | Gokhale et al. |
| 7,890,467 B2 | 2/2011 | Watanable et al. |
| 7,899,788 B2 | 3/2011 | Chandhok et al. |
| 7,917,617 B1 | 3/2011 | Ponnapur |
| 7,937,421 B2 | 5/2011 | Mikesell et al. |
| 7,937,612 B1 | 5/2011 | Lyadvinsky et al. |
| 8,001,277 B2 | 8/2011 | Mega et al. |
| 8,037,028 B2 | 10/2011 | Prahlad et al. |
| 8,037,032 B2 | 10/2011 | Pershin et al. |
| 8,046,550 B2 | 10/2011 | Feathergill |
| 8,051,473 B2 | 11/2011 | Szucs |
| 8,055,745 B2 | 11/2011 | Atluri |
| 8,060,476 B1 | 11/2011 | Afonso et al. |
| 8,069,271 B2 | 11/2011 | Brunet et al. |
| 8,099,391 B1 | 1/2012 | Monckton |
| 8,108,638 B2 | 1/2012 | Kishi |
| 8,108,640 B1 | 1/2012 | Holl, II |
| 8,117,492 B1 | 2/2012 | Searls et al. |
| 8,131,681 B1 | 3/2012 | Hangud et al. |
| 8,135,930 B1 | 3/2012 | Mattox et al. |
| 8,140,786 B2 | 3/2012 | Bunte |
| 8,156,086 B2 | 4/2012 | Lu et al. |
| 8,156,301 B1 | 4/2012 | Khandelwal et al. |
| 8,170,995 B2 | 5/2012 | Prahlad et al. |
| 8,185,777 B2 | 5/2012 | Davies et al. |
| 8,185,893 B2 | 5/2012 | Hyser et al. |
| 8,195,623 B2 | 6/2012 | Prahlad et al. |
| 8,199,911 B1 | 6/2012 | Tsaur et al. |
| 8,200,637 B1 | 6/2012 | Stringham |
| 8,204,859 B2 | 6/2012 | Ngo |
| 8,219,524 B2 | 7/2012 | Gokhale |
| 8,219,653 B1 | 7/2012 | Keagy et al. |
| 8,219,769 B1 | 7/2012 | Wilk |
| 8,225,133 B1 | 7/2012 | Lyadvinsky et al. |
| 8,229,896 B1 | 7/2012 | Narayanan |
| 8,229,954 B2 | 7/2012 | Kottomtharayil et al. |
| 8,230,195 B2 | 7/2012 | Amarendran et al. |
| 8,230,256 B1 | 7/2012 | Raut |
| 8,271,443 B1 | 9/2012 | Swift et al. |
| 8,285,681 B2 | 10/2012 | Prahlad et al. |
| 8,291,170 B1 | 10/2012 | Zhang et al. |
| 8,291,407 B2 | 10/2012 | Greenwood et al. |
| 8,307,177 B2 | 11/2012 | Prahlad et al. |
| 8,307,187 B2 | 11/2012 | Chawla et al. |
| 8,315,992 B1 | 11/2012 | Gipp et al. |
| 8,336,040 B2 | 12/2012 | Davidson et al. |
| 8,364,652 B2 | 1/2013 | Vijayan et al. |
| 8,370,542 B2 | 2/2013 | Lu et al. |
| 8,396,838 B2 | 3/2013 | Brockway |
| 8,407,190 B2 | 3/2013 | Prahlad |
| 8,433,679 B2 | 4/2013 | Crescenti |
| 8,433,682 B2 | 4/2013 | Ngo |

(56) References Cited

U.S. PATENT DOCUMENTS

| | | |
|---|---|---|
| 8,434,131 B2 | 4/2013 | Varadharajan |
| 8,438,347 B1 | 5/2013 | Tawri et al. |
| 8,453,145 B1 | 5/2013 | Naik |
| 8,473,594 B2 | 6/2013 | Astete et al. |
| 8,479,304 B1 | 7/2013 | Clifford |
| 8,489,676 B1 | 7/2013 | Chaplin et al. |
| 8,504,526 B2 | 8/2013 | Gokhale et al. |
| 8,560,788 B1 | 10/2013 | Sreedharan et al. |
| 8,577,845 B2 | 11/2013 | Nguyen et al. |
| 8,578,120 B2 | 11/2013 | Attarde et al. |
| 8,578,126 B1 | 11/2013 | Gaonkar et al. |
| 8,595,191 B2 | 11/2013 | Prahlad et al. |
| 8,620,870 B2 | 12/2013 | Dwarampudi et al. |
| 8,650,389 B1 | 2/2014 | Thorewell et al. |
| 8,667,171 B2 | 3/2014 | Guo et al. |
| 8,706,867 B2 | 4/2014 | Vijayan |
| 8,751,857 B2 | 6/2014 | Frenkel et al. |
| 8,776,043 B1 | 7/2014 | Thimsen et al. |
| 8,793,222 B1 | 7/2014 | Stringham |
| 8,799,431 B2 | 8/2014 | Pabari |
| 8,825,720 B1 | 9/2014 | Xie et al. |
| 8,831,202 B1 | 9/2014 | Abidogun et al. |
| 8,850,146 B1 | 9/2014 | Majumdar |
| 8,904,081 B1 | 12/2014 | Kulkarni |
| 8,909,980 B1 | 12/2014 | Lewis et al. |
| 8,924,967 B2 | 12/2014 | Nelson |
| 8,930,496 B2 | 1/2015 | Gokhale et al. |
| 8,930,543 B2 | 1/2015 | Ashok et al. |
| 8,938,481 B2 | 1/2015 | Kumarasamy et al. |
| 8,938,643 B1 | 1/2015 | Karmarkar et al. |
| 8,954,446 B2 | 2/2015 | Vijayan et al. |
| 8,954,796 B1 | 2/2015 | Cohen et al. |
| 8,959,299 B2 | 2/2015 | Ngo et al. |
| 8,966,318 B1 | 2/2015 | Shah |
| 9,020,895 B1 | 4/2015 | Rajashekar |
| 9,020,900 B2 | 4/2015 | Vijayan et al. |
| 9,020,987 B1 | 4/2015 | Nanda et al. |
| 9,021,459 B1 | 4/2015 | Qu |
| 9,026,497 B2 | 5/2015 | Gokhale et al. |
| 9,026,498 B2 | 5/2015 | Kumarasamy |
| 9,069,587 B2 | 6/2015 | Agarwal et al. |
| 9,098,457 B2 | 8/2015 | Towstopiat et al. |
| 9,098,495 B2 | 8/2015 | Gokhale |
| 9,116,633 B2 | 8/2015 | Sancheti et al. |
| 9,124,633 B1 | 9/2015 | Eizadi et al. |
| 9,141,529 B2 | 9/2015 | Klein et al. |
| 9,146,755 B2 | 9/2015 | Lassonde et al. |
| 9,213,706 B2 | 12/2015 | Long et al. |
| 9,223,597 B2 | 12/2015 | Deshpande et al. |
| 9,235,474 B1 | 1/2016 | Petri et al. |
| 9,235,582 B1 | 1/2016 | Madiraju Varadaraju et al. |
| 9,239,687 B2 | 1/2016 | Vijayan et al. |
| 9,239,762 B1 | 1/2016 | Gunda et al. |
| 9,244,777 B2 | 1/2016 | Boullery et al. |
| 9,246,996 B1 | 1/2016 | Brooker |
| 9,268,602 B2 | 2/2016 | Prahlad et al. |
| 9,280,378 B2 | 3/2016 | Shah |
| 9,280,430 B2 | 3/2016 | Sarfare et al. |
| 9,286,086 B2 | 3/2016 | Deshpande et al. |
| 9,286,110 B2 | 3/2016 | Mitkar et al. |
| 9,292,350 B1 | 3/2016 | Pendharkar et al. |
| 9,298,386 B2 | 3/2016 | Baldwin et al. |
| 9,298,715 B2 | 3/2016 | Kumarasamy et al. |
| 9,311,121 B2 | 4/2016 | Deshpande et al. |
| 9,311,248 B2 | 4/2016 | Wagner |
| 9,336,076 B2 | 5/2016 | Baldwin et al. |
| 9,342,537 B2 | 5/2016 | Kumarasamy et al. |
| 9,372,827 B2 | 6/2016 | Kumarasamy et al. |
| 9,378,035 B2 | 6/2016 | Kirpalani |
| 9,397,944 B1 | 7/2016 | Hobbs et al. |
| 9,405,763 B2 | 8/2016 | Prahlad et al. |
| 9,417,968 B2 | 8/2016 | Dornemann et al. |
| 9,424,136 B1 | 8/2016 | Teater et al. |
| 9,436,555 B2 | 9/2016 | Dornemann et al. |
| 9,444,811 B2 | 9/2016 | Nara et al. |
| 9,448,731 B2 | 9/2016 | Nallathambi et al. |
| 9,451,023 B2 | 9/2016 | Sancheti |
| 9,461,881 B2 | 10/2016 | Kumarasamy |
| 9,471,441 B1 | 10/2016 | Lyadvinsky et al. |
| 9,477,683 B2 | 10/2016 | Ghosh |
| 9,483,361 B2 | 11/2016 | Gokhale et al. |
| 9,483,362 B2 | 11/2016 | Gokhale et al. |
| 9,483,363 B2 | 11/2016 | Gokhale et al. |
| 9,483,364 B2 | 11/2016 | Gokhale et al. |
| 9,489,244 B2 | 11/2016 | Mitkar et al. |
| 9,495,251 B2 | 11/2016 | Kottomtharayil et al. |
| 9,495,370 B1 | 11/2016 | Chatterjee et al. |
| 9,495,404 B2 | 11/2016 | Kumarasamy et al. |
| 9,563,518 B2 | 2/2017 | Klose |
| 9,575,789 B1 | 2/2017 | Rangari et al. |
| 9,575,991 B2 | 2/2017 | Ghosh |
| 9,588,847 B1 | 3/2017 | Natanzon et al. |
| 9,588,972 B2 | 3/2017 | Dwarampudi et al. |
| 9,594,636 B2 | 3/2017 | Mortensen et al. |
| 9,606,745 B2 | 3/2017 | Satoyama et al. |
| 9,612,966 B2 | 4/2017 | Joshi et al. |
| 9,632,882 B2 | 4/2017 | Kumarasamy et al. |
| 9,633,033 B2 | 4/2017 | Vijayan et al. |
| 9,639,274 B2 | 5/2017 | Maranna et al. |
| 9,639,426 B2 | 5/2017 | Pawar et al. |
| 9,652,283 B2 | 5/2017 | Mitkar et al. |
| 9,684,535 B2 | 6/2017 | Deshpande et al. |
| 9,684,567 B2 | 6/2017 | Derk et al. |
| 9,703,584 B2 | 7/2017 | Kottomtharayil et al. |
| 9,710,465 B2 | 7/2017 | Dornemann et al. |
| 9,766,989 B2 | 7/2017 | Mitkar et al. |
| 9,740,702 B2 | 8/2017 | Pawar et al. |
| 9,760,398 B1 | 9/2017 | Pai |
| 9,760,448 B1 | 9/2017 | Per et al. |
| 9,766,825 B2 | 9/2017 | Bhagi et al. |
| 9,811,427 B2 | 11/2017 | Klose |
| 9,823,977 B2 | 11/2017 | Dornemann et al. |
| 9,852,026 B2 | 12/2017 | Mitkar et al. |
| 9,886,346 B2 | 2/2018 | Kumarasamy et al. |
| 9,892,276 B2 | 2/2018 | Bell et al. |
| 9,898,213 B2 | 2/2018 | Joshi et al. |
| 9,928,001 B2 | 3/2018 | Dornemann et al. |
| 9,939,981 B2 | 4/2018 | White et al. |
| 9,965,306 B1 | 5/2018 | Natanzon |
| 9,965,316 B2 | 5/2018 | Deshpande et al. |
| 9,977,687 B2 | 5/2018 | Kottomtharayil et al. |
| 9,983,936 B2 | 5/2018 | Dornemann et al. |
| 9,990,253 B1 | 6/2018 | Rajimwale et al. |
| 9,996,287 B2 | 6/2018 | Dornemann et al. |
| 9,996,534 B2 | 6/2018 | Dornemann et al. |
| 10,001,935 B2 | 6/2018 | Gokhale et al. |
| 10,013,314 B2 | 7/2018 | Klose |
| 10,048,889 B2 | 8/2018 | Dornemann et al. |
| 10,061,658 B2 | 8/2018 | Long et al. |
| 10,061,663 B2 | 8/2018 | Vijayan et al. |
| 10,073,649 B2 | 9/2018 | DeJong et al. |
| 10,084,873 B2 | 9/2018 | Dornemann et al. |
| 10,108,652 B2 | 10/2018 | Kumarasamy et al. |
| 10,146,643 B2 | 12/2018 | Fang et al. |
| 10,152,251 B2 | 12/2018 | Sancheti et al. |
| 10,162,528 B2 | 12/2018 | Sancheti et al. |
| 10,162,873 B2 | 12/2018 | Desphande et al. |
| 10,191,816 B2 | 1/2019 | Vijayan et al. |
| 10,228,962 B2 | 3/2019 | Dornemann et al. |
| 10,229,133 B2 | 3/2019 | Vijayan et al. |
| 10,255,143 B2 | 4/2019 | Vijayan et al. |
| 10,365,839 B2 | 7/2019 | Gokhale et al. |
| 10,379,892 B2 | 8/2019 | Kripalani |
| 10,380,072 B2 | 8/2019 | Attarde et al. |
| 10,387,073 B2 | 8/2019 | Bhagi et al. |
| 10,387,269 B2 | 8/2019 | Muller et al. |
| 10,417,102 B2 | 9/2019 | Sanakkayala et al. |
| 10,437,505 B2 | 10/2019 | Dornemann et al. |
| 10,452,303 B2 | 10/2019 | Dornemann et al. |
| 10,474,483 B2 | 11/2019 | Kottomtharayil et al. |
| 10,474,542 B2 | 11/2019 | Mitkar et al. |
| 10,474,548 B2 | 11/2019 | Sanakkayala et al. |
| 10,474,638 B2 | 11/2019 | Mitkar et al. |
| 10,481,826 B2 | 11/2019 | Vijayan et al. |

(56) References Cited

U.S. PATENT DOCUMENTS

| | | |
|---|---|---|
| 10,481,984 B1 | 11/2019 | Semyonov et al. |
| 10,496,547 B1 | 12/2019 | Naenko |
| 10,503,619 B2 | 12/2019 | Kremane |
| 10,503,753 B2 | 12/2019 | Mitkar et al. |
| 10,534,672 B2 | 1/2020 | Klose |
| 10,534,673 B2 | 1/2020 | Gokhale et al. |
| 10,540,327 B2 | 1/2020 | Ngo et al. |
| 10,565,067 B2 | 2/2020 | Dornemann |
| 10,572,468 B2 | 2/2020 | Dornemann et al. |
| 10,592,145 B2 | 3/2020 | Bedadala et al. |
| 10,592,350 B2 | 3/2020 | Dornemann |
| 10,592,357 B2 | 3/2020 | Vijayan et al. |
| 10,628,267 B2 | 4/2020 | Prahlad et al. |
| 10,650,057 B2 | 5/2020 | Pawar et al. |
| 10,673,943 B2 | 6/2020 | Prahlad et al. |
| 10,678,758 B2 | 6/2020 | Dornemann |
| 10,684,883 B2 | 6/2020 | Deshpande et al. |
| 10,684,924 B2 | 6/2020 | Kilaru et al. |
| 10,732,885 B2 | 8/2020 | Gutta et al. |
| 10,733,143 B2 | 8/2020 | Pawar et al. |
| 10,747,630 B2 | 8/2020 | Sanakkayala et al. |
| 10,768,971 B2 | 9/2020 | Dornemann et al. |
| 10,776,209 B2 | 9/2020 | Pawar et al. |
| 10,838,824 B2 | 11/2020 | Klose |
| 10,853,195 B2 | 12/2020 | Ashraf et al. |
| 10,877,928 B2 | 12/2020 | Nagrale et al. |
| 10,884,635 B2 | 1/2021 | Gokhale et al. |
| 10,896,104 B2 | 1/2021 | Sanakkayala et al. |
| 10,990,484 B2 | 4/2021 | Gokhale et al. |
| 11,016,696 B2 | 5/2021 | Ankireddypalle et al. |
| 11,099,943 B2 | 8/2021 | Gokhale et al. |
| 11,099,956 B1 | 8/2021 | Polimera et al. |
| 11,200,124 B2 | 12/2021 | Rathi et al. |
| 2001/0044910 A1 | 11/2001 | Ricart et al. |
| 2002/0069369 A1 | 6/2002 | Tremain |
| 2002/0095609 A1 | 7/2002 | Tokunaga |
| 2002/0178143 A1 | 11/2002 | Fujimoto |
| 2002/0194511 A1 | 12/2002 | Swoboda |
| 2003/0021223 A1 | 1/2003 | Kashyap |
| 2003/0031127 A1 | 2/2003 | Saleh et al. |
| 2003/0056142 A1 | 3/2003 | Hashemi et al. |
| 2003/0074600 A1 | 4/2003 | Tamatsu |
| 2003/0084076 A1 | 5/2003 | Sekiguchi et al. |
| 2003/0126494 A1 | 7/2003 | Strasser |
| 2003/0149750 A1 | 8/2003 | Franzenburg |
| 2003/0163495 A1 | 8/2003 | Lanzatella et al. |
| 2003/0182301 A1 | 9/2003 | Patterson et al. |
| 2003/0182329 A1 | 9/2003 | Sato |
| 2003/0204597 A1 | 10/2003 | Arakawa et al. |
| 2003/0236956 A1 | 12/2003 | Grubbs et al. |
| 2004/0019892 A1 | 1/2004 | E. et al. |
| 2004/0030668 A1 | 2/2004 | Pawlowski et al. |
| 2004/0030822 A1 | 2/2004 | Rajan et al. |
| 2004/0044642 A1 | 3/2004 | Fujii et al. |
| 2004/0078654 A1 | 4/2004 | Holland et al. |
| 2004/0128442 A1 | 7/2004 | Hinshaw et al. |
| 2004/0139127 A1 | 7/2004 | Pofelski |
| 2004/0153823 A1 | 8/2004 | Ansari |
| 2004/0230899 A1 | 11/2004 | Pagnano et al. |
| 2004/0250033 A1 | 12/2004 | Prahlad et al. |
| 2004/0267838 A1 | 12/2004 | Curran et al. |
| 2004/0268175 A1 | 12/2004 | Koch et al. |
| 2005/0039069 A1 | 2/2005 | Prahlad et al. |
| 2005/0044114 A1 | 2/2005 | Kottomtharayil et al. |
| 2005/0060356 A1 | 3/2005 | Saika |
| 2005/0080970 A1 | 4/2005 | Jeyasingh et al. |
| 2005/0131996 A1 | 6/2005 | Mastrianni et al. |
| 2005/0138461 A1 | 6/2005 | Allen et al. |
| 2005/0183072 A1 | 8/2005 | Horning et al. |
| 2005/0187891 A1 | 8/2005 | Johnson et al. |
| 2005/0198303 A1 | 9/2005 | Knauerhase et al. |
| 2005/0216788 A1 | 9/2005 | Mani-Meitav et al. |
| 2005/0235286 A1 | 10/2005 | Ballew et al. |
| 2005/0257062 A1 | 11/2005 | Ignatius et al. |
| 2005/0262033 A1 | 11/2005 | Yamashita |
| 2005/0262097 A1 | 11/2005 | Sim-Tang |
| 2005/0262316 A1 | 11/2005 | Obayashi et al. |
| 2005/0268156 A1 | 12/2005 | Mashayekhi et al. |
| 2005/0278397 A1 | 12/2005 | Clark |
| 2006/0005048 A1 | 1/2006 | Osaki |
| 2006/0010227 A1 | 1/2006 | Atluri |
| 2006/0026452 A1 | 2/2006 | Suzuki et al. |
| 2006/0036658 A1 | 2/2006 | Henrickson |
| 2006/0047626 A1 | 3/2006 | Raheem |
| 2006/0058994 A1 | 3/2006 | Ravi et al. |
| 2006/0085672 A1 | 4/2006 | Watanabe et al. |
| 2006/0101189 A1 | 5/2006 | Chandrasekaran et al. |
| 2006/0155594 A1 | 7/2006 | Almeida et al. |
| 2006/0155712 A1 | 7/2006 | Prahlad et al. |
| 2006/0184935 A1 | 8/2006 | Abels et al. |
| 2006/0195715 A1 | 8/2006 | Herington |
| 2006/0206547 A1 | 9/2006 | Kulkarni et al. |
| 2006/0224846 A1 | 10/2006 | Amarendran et al. |
| 2006/0225065 A1 | 10/2006 | Chandhok et al. |
| 2006/0230136 A1 | 10/2006 | Ma |
| 2006/0236054 A1 | 10/2006 | Kitamura et al. |
| 2007/0027999 A1 | 2/2007 | Allen et al. |
| 2007/0043870 A1 | 2/2007 | Ninose |
| 2007/0050526 A1 | 3/2007 | Abe et al. |
| 2007/0074068 A1 | 3/2007 | Hsieh |
| 2007/0094467 A1 | 4/2007 | Yamasaki |
| 2007/0094533 A1 | 4/2007 | Coombs et al. |
| 2007/0100792 A1 | 5/2007 | Lent et al. |
| 2007/0150499 A1 | 6/2007 | D'Souza et al. |
| 2007/0156793 A1 | 7/2007 | D'Souza et al. |
| 2007/0185922 A1 | 8/2007 | Kapoor et al. |
| 2007/0185938 A1 | 8/2007 | Prahlad et al. |
| 2007/0186068 A1 | 8/2007 | Agrawal |
| 2007/0198802 A1 | 8/2007 | Kavuri |
| 2007/0203938 A1 | 8/2007 | Prahlad et al. |
| 2007/0208918 A1 | 9/2007 | Harbin et al. |
| 2007/0220319 A1 | 9/2007 | Desai et al. |
| 2007/0226535 A1 | 9/2007 | Gokhale |
| 2007/0234108 A1 | 10/2007 | Cox et al. |
| 2007/0234302 A1 | 10/2007 | Suzuki et al. |
| 2007/0239804 A1 | 10/2007 | Armstrong et al. |
| 2007/0250365 A1 | 10/2007 | Chakrabarti et al. |
| 2007/0266056 A1 | 11/2007 | Stacey et al. |
| 2007/0271471 A1 | 11/2007 | Merzlikine et al. |
| 2007/0282921 A1 | 12/2007 | Atluri et al. |
| 2007/0283355 A1 | 12/2007 | Misono et al. |
| 2007/0299930 A1 | 12/2007 | Wendelrup et al. |
| 2008/0022058 A1 | 1/2008 | Nadathur et al. |
| 2008/0059704 A1 | 3/2008 | Kavuri |
| 2008/0071841 A1 | 3/2008 | Okada et al. |
| 2008/0091655 A1 | 4/2008 | Gokhale |
| 2008/0098049 A1 | 4/2008 | Pillai et al. |
| 2008/0126833 A1 | 5/2008 | Callaway et al. |
| 2008/0134177 A1 | 6/2008 | Fitzgerald et al. |
| 2008/0147754 A1 | 6/2008 | Littlefield et al. |
| 2008/0162840 A1 | 7/2008 | Augenstein |
| 2008/0189468 A1 | 8/2008 | Schmidt et al. |
| 2008/0195639 A1 | 8/2008 | Freeman et al. |
| 2008/0201600 A1 | 8/2008 | Lu |
| 2008/0228771 A1 | 9/2008 | Prahlad et al. |
| 2008/0228833 A1 | 9/2008 | Kano |
| 2008/0229037 A1 | 9/2008 | Bunte |
| 2008/0235479 A1 | 9/2008 | Scales et al. |
| 2008/0243855 A1 | 10/2008 | Prahlad |
| 2008/0243947 A1 | 10/2008 | Kaneda |
| 2008/0244068 A1 | 10/2008 | Iyoda et al. |
| 2008/0244177 A1 | 10/2008 | Crescenti et al. |
| 2008/0244204 A1 | 10/2008 | Cremelie et al. |
| 2008/0250407 A1 | 10/2008 | Dadhia et al. |
| 2008/0253283 A1 | 10/2008 | Douglis et al. |
| 2008/0270488 A1 | 10/2008 | Ozawa et al. |
| 2008/0270564 A1 | 10/2008 | Rangegowda et al. |
| 2008/0275924 A1 | 11/2008 | Fries |
| 2008/0282253 A1 | 11/2008 | Huizenga |
| 2008/0307020 A1 | 12/2008 | Ko et al. |
| 2008/0313371 A1 | 12/2008 | Kedem et al. |
| 2008/0320319 A1 | 12/2008 | Muller |
| 2009/0006733 A1 | 1/2009 | Gold et al. |
| 2009/0013258 A1 | 1/2009 | Hintermeister et al. |

(56) References Cited

U.S. PATENT DOCUMENTS

| | | |
|---|---|---|
| 2009/0037680 A1 | 2/2009 | Colbert et al. |
| 2009/0037763 A1 | 2/2009 | Adhya et al. |
| 2009/0055507 A1 | 2/2009 | Oeda |
| 2009/0077557 A1 | 3/2009 | Ichikawa et al. |
| 2009/0113109 A1 | 4/2009 | Nelson et al. |
| 2009/0144416 A1 | 6/2009 | Chatley et al. |
| 2009/0157882 A1 | 6/2009 | Kashyap |
| 2009/0183145 A1 | 7/2009 | Hu et al. |
| 2009/0204649 A1 | 8/2009 | Wong et al. |
| 2009/0210427 A1 | 8/2009 | Eidler et al. |
| 2009/0210458 A1 | 8/2009 | Glover et al. |
| 2009/0216816 A1 | 8/2009 | Basler et al. |
| 2009/0222496 A1 | 9/2009 | Liu et al. |
| 2009/0228669 A1 | 9/2009 | Slesarev et al. |
| 2009/0240904 A1 | 9/2009 | Austruy et al. |
| 2009/0243846 A1 | 10/2009 | Yuuki |
| 2009/0248762 A1 | 10/2009 | Prahlad et al. |
| 2009/0249005 A1 | 10/2009 | Bender et al. |
| 2009/0282404 A1 | 11/2009 | Khandekar et al. |
| 2009/0287665 A1 | 11/2009 | Prahlad |
| 2009/0300023 A1 | 12/2009 | Vaghani |
| 2009/0300057 A1 | 12/2009 | Friedman |
| 2009/0307166 A1 | 12/2009 | Routray et al. |
| 2009/0313260 A1 | 12/2009 | Mimatsu |
| 2009/0313447 A1 | 12/2009 | Nguyen et al. |
| 2009/0313503 A1 | 12/2009 | Atluri et al. |
| 2009/0319534 A1 | 12/2009 | Gokhale |
| 2009/0319585 A1 | 12/2009 | Gokhale |
| 2009/0320029 A1 | 12/2009 | Kottomtharayil |
| 2009/0320137 A1 | 12/2009 | White et al. |
| 2009/0327477 A1 | 12/2009 | Madison, Jr. et al. |
| 2010/0011178 A1 | 1/2010 | Feathergill |
| 2010/0017444 A1 | 1/2010 | Chatterjee et al. |
| 2010/0017647 A1 | 1/2010 | Callaway et al. |
| 2010/0030984 A1 | 2/2010 | Erickson |
| 2010/0031086 A1 | 2/2010 | Leppard |
| 2010/0042790 A1 | 2/2010 | Mondal et al. |
| 2010/0049929 A1 | 2/2010 | Nagarkar et al. |
| 2010/0049930 A1 | 2/2010 | Pershin |
| 2010/0070466 A1 | 3/2010 | Prahlad et al. |
| 2010/0070474 A1 | 3/2010 | Lad |
| 2010/0070478 A1 | 3/2010 | Anglin |
| 2010/0070725 A1 | 3/2010 | Prahlad et al. |
| 2010/0070726 A1 | 3/2010 | Ngo et al. |
| 2010/0077161 A1 | 3/2010 | Stoakes et al. |
| 2010/0082672 A1 | 4/2010 | Kottomtharayil |
| 2010/0094948 A1 | 4/2010 | Ganesh et al. |
| 2010/0094981 A1 | 4/2010 | Cordray |
| 2010/0101300 A1 | 4/2010 | Rigby et al. |
| 2010/0106691 A1 | 4/2010 | Preslan et al. |
| 2010/0107158 A1 | 4/2010 | Chen et al. |
| 2010/0107172 A1 | 4/2010 | Calinescu et al. |
| 2010/0161919 A1 | 6/2010 | Dodgson et al. |
| 2010/0162037 A1 | 6/2010 | Maule et al. |
| 2010/0186014 A1 | 7/2010 | Vaghani et al. |
| 2010/0211829 A1 | 8/2010 | Ziskind et al. |
| 2010/0223495 A1 | 9/2010 | Leppard |
| 2010/0228913 A1 | 9/2010 | Czezatke et al. |
| 2010/0242096 A1 | 9/2010 | Varadharajan et al. |
| 2010/0250549 A1 | 9/2010 | Muller et al. |
| 2010/0257523 A1 | 10/2010 | Frank |
| 2010/0262586 A1 | 10/2010 | Rosikiewicz et al. |
| 2010/0262794 A1 | 10/2010 | De Beer et al. |
| 2010/0280999 A1 | 11/2010 | Atluri et al. |
| 2010/0281458 A1 | 11/2010 | Paladino et al. |
| 2010/0293439 A1 | 11/2010 | Flynn et al. |
| 2010/0299309 A1 | 11/2010 | Maki et al. |
| 2010/0299490 A1 | 11/2010 | Attarde et al. |
| 2010/0299666 A1 | 11/2010 | Agbaria et al. |
| 2010/0306173 A1 | 12/2010 | Frank |
| 2010/0306486 A1 | 12/2010 | Balasubramanian et al. |
| 2010/0325471 A1 | 12/2010 | Mishra et al. |
| 2010/0325727 A1 | 12/2010 | Neystad et al. |
| 2010/0332401 A1 | 12/2010 | Prahlad |
| 2010/0332454 A1 | 12/2010 | Prahlad et al. |
| 2010/0332456 A1 | 12/2010 | Prahlad et al. |
| 2010/0332479 A1 | 12/2010 | Prahlad |
| 2010/0332629 A1 | 12/2010 | Cotugno et al. |
| 2010/0332818 A1 | 12/2010 | Prahlad |
| 2010/0333100 A1 | 12/2010 | Miyazaki et al. |
| 2010/0333116 A1 | 12/2010 | Prahlad |
| 2011/0004586 A1 | 1/2011 | Cherryholmes et al. |
| 2011/0010515 A1 | 1/2011 | Ranade |
| 2011/0016467 A1 | 1/2011 | Kane |
| 2011/0022811 A1 | 1/2011 | Kirihata et al. |
| 2011/0023114 A1 | 1/2011 | Diab et al. |
| 2011/0035620 A1 | 2/2011 | Elyashev et al. |
| 2011/0047541 A1 | 2/2011 | Yamaguchi et al. |
| 2011/0061045 A1 | 3/2011 | Phillips |
| 2011/0072430 A1 | 3/2011 | Mani |
| 2011/0087632 A1 | 4/2011 | Subramanian et al. |
| 2011/0107025 A1 | 5/2011 | Urkude et al. |
| 2011/0107331 A1 | 5/2011 | Evans et al. |
| 2011/0153570 A1 | 6/2011 | Kim et al. |
| 2011/0154109 A1 | 6/2011 | Levine |
| 2011/0161299 A1 | 6/2011 | Prahlad |
| 2011/0179414 A1 | 7/2011 | Goggin et al. |
| 2011/0185355 A1 | 7/2011 | Chawla et al. |
| 2011/0191559 A1 | 8/2011 | Li et al. |
| 2011/0202728 A1 | 8/2011 | Nichols et al. |
| 2011/0202734 A1 | 8/2011 | Dhakras et al. |
| 2011/0208928 A1 | 8/2011 | Chandra et al. |
| 2011/0213754 A1 | 9/2011 | Bindal |
| 2011/0218967 A1 | 9/2011 | Sliger et al. |
| 2011/0219144 A1 | 9/2011 | Amit et al. |
| 2011/0225277 A1 | 9/2011 | Freimuth et al. |
| 2011/0234583 A1 | 9/2011 | Bakalash |
| 2011/0239013 A1 | 9/2011 | Muller |
| 2011/0246430 A1 | 10/2011 | Prahlad et al. |
| 2011/0252208 A1 | 10/2011 | All et al. |
| 2011/0264786 A1 | 10/2011 | Kedem et al. |
| 2011/0289281 A1 | 11/2011 | Spackman |
| 2012/0016840 A1 | 1/2012 | Lin et al. |
| 2012/0017027 A1 | 1/2012 | Baskakov et al. |
| 2012/0017043 A1 | 1/2012 | Aizman et al. |
| 2012/0017114 A1 | 1/2012 | Timashev et al. |
| 2012/0054736 A1 | 3/2012 | Arcese et al. |
| 2012/0072685 A1 | 3/2012 | Otani |
| 2012/0078881 A1 | 3/2012 | Crump et al. |
| 2012/0079221 A1 | 3/2012 | Sivasubramanian et al. |
| 2012/0084262 A1 | 4/2012 | Dwarampudi et al. |
| 2012/0084272 A1 | 4/2012 | Garces-Erice et al. |
| 2012/0084769 A1 | 4/2012 | Adi et al. |
| 2012/0096149 A1 | 4/2012 | Sunkara et al. |
| 2012/0101999 A1 | 4/2012 | Scherzinger |
| 2012/0110328 A1 | 5/2012 | Pate et al. |
| 2012/0131295 A1 | 5/2012 | Nakajima |
| 2012/0131578 A1 | 5/2012 | Ciano et al. |
| 2012/0136832 A1 | 5/2012 | Sadhwani |
| 2012/0150815 A1 | 6/2012 | Parfumi |
| 2012/0150818 A1 | 6/2012 | Vijayan Retnamma et al. |
| 2012/0150826 A1 | 6/2012 | Vijayan Retnamma et al. |
| 2012/0150949 A1 | 6/2012 | Vijayan Retnamma et al. |
| 2012/0151084 A1 | 6/2012 | Stathopoulos et al. |
| 2012/0159232 A1 | 6/2012 | Shimada et al. |
| 2012/0167083 A1 | 6/2012 | Suit |
| 2012/0209812 A1 | 8/2012 | Bezbaruah |
| 2012/0221843 A1 | 8/2012 | Bak |
| 2012/0233285 A1 | 9/2012 | Suzuki |
| 2012/0254119 A1 | 10/2012 | Kumarasamy et al. |
| 2012/0254364 A1 | 10/2012 | Vijayan |
| 2012/0254824 A1 | 10/2012 | Bansold |
| 2012/0278287 A1 | 11/2012 | Wilk |
| 2012/0278571 A1 | 11/2012 | Fleming et al. |
| 2012/0278799 A1 | 11/2012 | Starks et al. |
| 2012/0290802 A1 | 11/2012 | Wade et al. |
| 2012/0324183 A1 | 12/2012 | Chiruvolu et al. |
| 2012/0331248 A1 | 12/2012 | Kono et al. |
| 2013/0024641 A1 | 1/2013 | Talagala et al. |
| 2013/0024722 A1 | 1/2013 | Kotagiri |
| 2013/0036418 A1 | 2/2013 | Yadappanavar et al. |
| 2013/0042234 A1 | 2/2013 | Deluca et al. |
| 2013/0054533 A1 | 2/2013 | Hao et al. |
| 2013/0061014 A1 | 3/2013 | Prahlad et al. |

(56) References Cited

U.S. PATENT DOCUMENTS

| | | |
|---|---|---|
| 2013/0074181 A1 | 3/2013 | Singh |
| 2013/0080841 A1 | 3/2013 | Reddy et al. |
| 2013/0086580 A1 | 4/2013 | Simonsen et al. |
| 2013/0117744 A1 | 5/2013 | Klein et al. |
| 2013/0138880 A1 | 5/2013 | Murata |
| 2013/0173771 A1 | 7/2013 | Ditto et al. |
| 2013/0204849 A1 | 8/2013 | Chacko |
| 2013/0227558 A1 | 8/2013 | Du et al. |
| 2013/0232215 A1 | 9/2013 | Gupta et al. |
| 2013/0232480 A1 | 9/2013 | Winterfeldt et al. |
| 2013/0238562 A1 | 9/2013 | Kumarasamy |
| 2013/0238572 A1 | 9/2013 | Prahlad et al. |
| 2013/0262390 A1 | 10/2013 | Kumarasamy et al. |
| 2013/0262396 A1 | 10/2013 | Kripalani et al. |
| 2013/0262638 A1 | 10/2013 | Kumarasamy et al. |
| 2013/0262801 A1 | 10/2013 | Sancheti et al. |
| 2013/0268931 A1 | 10/2013 | O'Hare et al. |
| 2013/0290267 A1 | 10/2013 | Dwarampudi et al. |
| 2013/0311429 A1 | 11/2013 | Agetsuma |
| 2013/0326260 A1 | 12/2013 | Wei et al. |
| 2014/0006858 A1 | 1/2014 | Helfman et al. |
| 2014/0007097 A1 | 1/2014 | Chin et al. |
| 2014/0007181 A1 | 1/2014 | Sarin et al. |
| 2014/0052892 A1 | 2/2014 | Klein et al. |
| 2014/0059380 A1 | 2/2014 | Krishnan |
| 2014/0075440 A1 | 3/2014 | Prahlad et al. |
| 2014/0082128 A1 | 3/2014 | Beard |
| 2014/0089266 A1 | 3/2014 | Une et al. |
| 2014/0095816 A1 | 4/2014 | Hsu et al. |
| 2014/0101300 A1 | 4/2014 | Rosensweig et al. |
| 2014/0115285 A1 | 4/2014 | Arcese et al. |
| 2014/0115287 A1 | 4/2014 | Schnapp et al. |
| 2014/0136803 A1 | 5/2014 | Qin |
| 2014/0143636 A1 | 5/2014 | Frost et al. |
| 2014/0156684 A1 | 6/2014 | Zaslavsky et al. |
| 2014/0181038 A1 | 6/2014 | Pawar et al. |
| 2014/0181044 A1 | 6/2014 | Pawar et al. |
| 2014/0181046 A1 | 6/2014 | Pawar et al. |
| 2014/0188803 A1 | 7/2014 | James et al. |
| 2014/0195749 A1 | 7/2014 | Colgrove et al. |
| 2014/0196037 A1 | 7/2014 | Gopalan et al. |
| 2014/0196038 A1 | 7/2014 | Kottomtharayil et al. |
| 2014/0196039 A1 | 7/2014 | Kottomtharayil et al. |
| 2014/0201142 A1 | 7/2014 | Varadharajan et al. |
| 2014/0201151 A1 | 7/2014 | Kumarasamy et al. |
| 2014/0201153 A1 | 7/2014 | Vijayan et al. |
| 2014/0201157 A1 | 7/2014 | Pawar et al. |
| 2014/0201162 A1 | 7/2014 | Kumarasamy et al. |
| 2014/0201170 A1 | 7/2014 | Vijayan et al. |
| 2014/0229451 A1 | 8/2014 | Venkatesh et al. |
| 2014/0237537 A1 | 8/2014 | Manmohan et al. |
| 2014/0244610 A1 | 8/2014 | Raman et al. |
| 2014/0258245 A1 | 9/2014 | Estes |
| 2014/0259015 A1 | 9/2014 | Chigusa et al. |
| 2014/0278530 A1 | 9/2014 | Bruce et al. |
| 2014/0281758 A1 | 9/2014 | Klein et al. |
| 2014/0282514 A1 | 9/2014 | Carson et al. |
| 2014/0330874 A1 | 11/2014 | Novak et al. |
| 2014/0337285 A1 | 11/2014 | Gokhale et al. |
| 2014/0337295 A1 | 11/2014 | Haselton et al. |
| 2014/0337664 A1 | 11/2014 | Gokhale et al. |
| 2014/0344323 A1 | 11/2014 | Pelavin et al. |
| 2014/0372384 A1 | 12/2014 | Long et al. |
| 2015/0058382 A1 | 2/2015 | St. Laurent |
| 2015/0067391 A1 | 3/2015 | Merchant et al. |
| 2015/0067393 A1 | 3/2015 | Madani et al. |
| 2015/0074536 A1 | 3/2015 | Varadharajan et al. |
| 2015/0088821 A1 | 3/2015 | Blea et al. |
| 2015/0089185 A1 | 3/2015 | Brandyberry et al. |
| 2015/0095908 A1 | 4/2015 | Jacobs et al. |
| 2015/0120928 A1 | 4/2015 | Gummaraju et al. |
| 2015/0121122 A1 | 4/2015 | Towstopiat et al. |
| 2015/0134607 A1 | 5/2015 | Magdon-Lsmail et al. |
| 2015/0142745 A1 | 5/2015 | Tekade et al. |
| 2015/0149813 A1 | 5/2015 | Mizuno et al. |
| 2015/0160884 A1 | 6/2015 | Scales et al. |
| 2015/0161015 A1 | 6/2015 | Kumarasamy et al. |
| 2015/0163172 A1 | 6/2015 | Mudigonda et al. |
| 2015/0199238 A1 | 7/2015 | Badgley |
| 2015/0205682 A1 | 7/2015 | Gokhale et al. |
| 2015/0227438 A1 | 8/2015 | Jaquette |
| 2015/0227602 A1 | 8/2015 | Ramu |
| 2015/0242283 A1 | 8/2015 | Simoncelli et al. |
| 2015/0248333 A1 | 9/2015 | Aravot |
| 2015/0268876 A1 | 9/2015 | Ahn et al. |
| 2015/0278046 A1 | 10/2015 | Zellermayer et al. |
| 2015/0293817 A1 | 10/2015 | Subramanian et al. |
| 2015/0317216 A1 | 11/2015 | Hsu et al. |
| 2015/0347165 A1 | 12/2015 | Lipchuk et al. |
| 2015/0347306 A1 | 12/2015 | Gschwind |
| 2015/0347430 A1 | 12/2015 | Ghosh |
| 2015/0350027 A1 | 12/2015 | Raissinia et al. |
| 2015/0363413 A1 | 12/2015 | Ghosh |
| 2015/0370652 A1 | 12/2015 | He et al. |
| 2015/0370668 A1 | 12/2015 | Nazari et al. |
| 2015/0378758 A1 | 12/2015 | Duggan et al. |
| 2015/0378771 A1 | 12/2015 | Tarasuk-Levin |
| 2015/0378833 A1 | 12/2015 | Misra et al. |
| 2015/0378849 A1 | 12/2015 | Liu et al. |
| 2015/0381711 A1 | 12/2015 | Singh et al. |
| 2016/0019317 A1 | 1/2016 | Pawar et al. |
| 2016/0026405 A1 | 1/2016 | Dhuse |
| 2016/0070623 A1 | 3/2016 | Derk |
| 2016/0085606 A1 | 3/2016 | Panasko et al. |
| 2016/0092467 A1 | 3/2016 | Lee et al. |
| 2016/0132400 A1 | 5/2016 | Pawar et al. |
| 2016/0154709 A1 | 6/2016 | Mitkar et al. |
| 2016/0170844 A1 | 6/2016 | Long et al. |
| 2016/0188413 A1 | 6/2016 | Abali et al. |
| 2016/0202916 A1 | 7/2016 | Cui et al. |
| 2016/0203060 A1 | 7/2016 | Singh |
| 2016/0210064 A1 | 7/2016 | Dornemann et al. |
| 2016/0226966 A1 | 8/2016 | Lin |
| 2016/0283335 A1 | 9/2016 | Yao et al. |
| 2016/0299818 A1 | 10/2016 | Vijayan et al. |
| 2016/0306706 A1 | 10/2016 | Pawar et al. |
| 2016/0308722 A1 | 10/2016 | Kumarasamy et al. |
| 2016/0335007 A1 | 11/2016 | Ryu et al. |
| 2016/0350391 A1 | 12/2016 | Vijayan et al. |
| 2016/0371127 A1 | 12/2016 | Antony |
| 2017/0031768 A1 | 2/2017 | Sarab |
| 2017/0054720 A1 | 2/2017 | Geng et al. |
| 2017/0090972 A1 | 3/2017 | Ryu et al. |
| 2017/0123939 A1 | 5/2017 | Maheshwari et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0192868 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0249220 A1 | 8/2017 | Kumarasamy et al. |
| 2017/0262204 A1 | 9/2017 | Dornemann et al. |
| 2017/0262347 A1 | 9/2017 | Dornemann |
| 2017/0262350 A1 | 9/2017 | Dornemann |
| 2017/0264589 A1 | 9/2017 | Hunt et al. |
| 2017/0286230 A1 | 10/2017 | Zamir |
| 2017/0315876 A1 | 11/2017 | Dornquast et al. |
| 2017/0371547 A1 | 12/2017 | Fruchtman et al. |
| 2018/0011885 A1 | 1/2018 | Prahlad et al. |
| 2018/0067955 A1 | 3/2018 | Pawar et al. |
| 2018/0075166 A1 | 3/2018 | Pawar et al. |
| 2018/0089031 A1 | 3/2018 | Dornemann et al. |
| 2018/0095846 A1 | 4/2018 | Sanakkayala et al. |
| 2018/0113623 A1 | 4/2018 | Sancheti |
| 2018/0143879 A1 | 5/2018 | Dornemann |
| 2018/0143880 A1 | 5/2018 | Dornemann |
| 2018/0173454 A1 | 6/2018 | Dornemann et al. |
| 2018/0181598 A1 | 6/2018 | Pawar et al. |
| 2018/0253192 A1 | 9/2018 | Varadharajan et al. |
| 2018/0260157 A1 | 9/2018 | Dornemann et al. |
| 2018/0267861 A1 | 9/2018 | Iyer et al. |
| 2018/0275913 A1 | 9/2018 | Mitkar et al. |
| 2018/0276022 A1 | 9/2018 | Mitkar et al. |

(56) References Cited

U.S. PATENT DOCUMENTS

| | | |
|---|---|---|
| 2018/0276083 A1 | 9/2018 | Mitkar et al. |
| 2018/0276084 A1 | 9/2018 | Mitkar et al. |
| 2018/0276085 A1 | 9/2018 | Mitkar et al. |
| 2018/0284986 A1 | 10/2018 | Bhagi et al. |
| 2018/0285202 A1 | 10/2018 | Bhagi et al. |
| 2018/0285209 A1 | 10/2018 | Liu et al. |
| 2018/0285215 A1 | 10/2018 | Ashraf et al. |
| 2018/0285353 A1 | 10/2018 | Rao et al. |
| 2018/0300168 A1 | 10/2018 | Deshpande et al. |
| 2018/0307510 A1 | 10/2018 | Kottomtharayil et al. |
| 2018/0314694 A1 | 11/2018 | Dornemann et al. |
| 2018/0329636 A1 | 11/2018 | Dornemann et al. |
| 2018/0373597 A1 | 12/2018 | Rana |
| 2018/0373601 A1 | 12/2018 | Klose |
| 2019/0012339 A1 | 1/2019 | Kumarasamy et al. |
| 2019/0026187 A1 | 1/2019 | Gulam et al. |
| 2019/0065069 A1 | 2/2019 | Sancheti et al. |
| 2019/0090305 A1 | 3/2019 | Hunter et al. |
| 2019/0108341 A1 | 4/2019 | Bedhapudi et al. |
| 2019/0196916 A1 | 6/2019 | Kumarasamy et al. |
| 2019/0205216 A1 | 7/2019 | Gokhale et al. |
| 2019/0205217 A1 | 7/2019 | Gokhale et al. |
| 2019/0272220 A1 | 9/2019 | Vijayan et al. |
| 2019/0272221 A1 | 9/2019 | Vijayan et al. |
| 2019/0278662 A1 | 9/2019 | Nagrale et al. |
| 2019/0324791 A1 | 10/2019 | Kripalani |
| 2019/0347120 A1 | 11/2019 | Kottomtharayil et al. |
| 2019/0369901 A1 | 12/2019 | Dornemann et al. |
| 2019/0370107 A1 | 12/2019 | Subburasu et al. |
| 2019/0391742 A1 | 12/2019 | Bhagi et al. |
| 2020/0034252 A1 | 1/2020 | Mitkar et al. |
| 2020/0142612 A1 | 5/2020 | Dornemann et al. |
| 2020/0142782 A1 | 5/2020 | Dornemann |
| 2020/0142783 A1 | 5/2020 | Dornemann |
| 2020/0159627 A1 | 5/2020 | Bedadala et al. |
| 2020/0174894 A1 | 6/2020 | Dornemann |
| 2020/0174895 A1 | 6/2020 | Dornemann |
| 2020/0183728 A1 | 6/2020 | Deshpande et al. |
| 2020/0183802 A1 | 6/2020 | Rathi et al. |
| 2020/0241907 A1 | 7/2020 | Dornemann et al. |
| 2020/0241908 A1 | 7/2020 | Dornemann et al. |
| 2020/0265024 A1 | 8/2020 | Pawar et al. |
| 2020/0301891 A1 | 9/2020 | Dornemann |
| 2020/0327163 A1 | 10/2020 | Pawar et al. |
| 2020/0334113 A1 | 10/2020 | Sanakkayala et al. |
| 2020/0334201 A1 | 10/2020 | Pawar et al. |
| 2020/0334221 A1 | 10/2020 | Prahlad et al. |
| 2021/0334002 A1 | 10/2021 | Ankireddypalle et al. |
| 2021/0342237 A1 | 11/2021 | Polimera et al. |
| 2022/0012135 A1 | 1/2022 | Gokhale et al. |

FOREIGN PATENT DOCUMENTS

| | | |
|---|---|---|
| DE | 69415115.7 | 8/1999 |
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0645709 | 3/1995 |
| EP | 0774715 | 5/1997 |
| EP | 0809184 | 11/1997 |
| EP | 0817040 A2 | 1/1998 |
| EP | 0899662 | 3/1999 |
| EP | 0981090 | 2/2000 |
| EP | 1204922 | 5/2002 |
| EP | 1209569 A1 | 5/2002 |
| EP | 1384135 | 1/2004 |
| EP | 1387269 A1 | 2/2004 |
| EP | 1393181 | 3/2004 |
| EP | 1533701 | 5/2005 |
| EP | 1938192 B1 | 11/2009 |
| GB | 2447361 | 9/2008 |
| JP | 4198050 | 12/2008 |
| JP | 4267443 | 5/2009 |
| WO | WO 1995/013580 | 5/1995 |
| WO | WO 1999/012098 | 3/1999 |
| WO | WO 2004/023317 | 3/2004 |
| WO | WO 2005/050449 A1 | 6/2005 |
| WO | WO 2005/103955 A1 | 11/2005 |
| WO | WO 2006/052872 | 5/2006 |
| WO | WO 2007/021678 A2 | 2/2007 |
| WO | WO2010/140264 A1 | 12/2010 |

OTHER PUBLICATIONS

Li et al., "Research on the Backup Mechanism of Oracle Database" International Conference on Environmental Science and Information Application Technology, Jul. 2009, pp. 423-426.

Adjeroh, Donald A., and Kingsley C. Nwosu. "Multimedia database management-requirements and issues." IEEE multimedia 4.3 (1997): pp. 24-33. (Year: 1997).

Armstead et al., "Implementation of a Campus-wide Distributed Mass Storage Service: The Dream vs. Reality," IEEE, Sep. 11-14, 1995, pp. 190-199.

Bonvin, Nicolas, Thanasis G. Papaioannou, and Karl Aberer. "Dynamic cost-efficient replication in data clouds." Proceedings of the 1st Workshop on Automated Control for Datacenters and Clouds. 2009.pp. 49-56 (Year: 2009).

Brandon, J., "Virtualization Shakes Up Backup Strategy," <http://www.computerworld.com>, Feb. 21, 2008, 3 pages.

Celesti, et al., "Improving Virtual Machine Migration in Federated Cloud Environments", 2010, pp. 61-67.

Chan, et al., "An Approach to High Availability for Cloud Servers with Snapshot Mechanism," 2012, pp. 1-6.

Chen et al., "When Virtual Is Better Than Real", IEEE 2001, pp. 133-138.

Chervenak, et al., "Protecting File Systems—A Survey of Backup Techniques," 1998, pp. 17-31.

Chiappetta, Marco, "ESA Enthusiast System Architecture," <http://hothardware.com/Articles/NVIDIA-ESA-Enthusiast-System-Architecture/>, Nov. 5, 2007, 2 pages.

CommVault Systems, Inc., "A CommVault White Paper: VMware Consolidated Backup (VCB) Certification Information Kit," 2007, 23 pages.

CommVault Systems, Inc., "CommVault Solutions—VMware," <http://www.commvault.com/solutions/vmware/>, accessed Apr. 30, 2014, 1 page.

CommVault Systems, Inc., "Enhanced Protection and Manageability of Virtual Servers," Partner Solution Brief, 2008, 6 pages.

Cully, et al., "Remus: High Availability via Asynchronous Virtual Machine Replication", 2008, pp. 161-174.

Data Protection for Large Vmware and Vblock Environments Using EMC Avamar Applied Technology, Nov. 2010, EMC Corporation, 26 pages.

Davis, D., "3 VMware Consolidated Backup (VCB) Utilities You Should Know," Petri IT Knowlegebase, <http://www.petri.co.il/vmware-consolidated-backup-utilities.htm>, Nov. 16, 2007, 3 pages.

Davis, D., "Understanding VMware VMX Configuration Files," Petri IT Knowledgebase, <http://www.petri.co.il/virtual_vmware_vmx_configuration_files.htm>, Nov. 16, 2007, 3 pages.

Davis, D., "VMware Server & Workstation Disk Files Explained," Petri IT Knowledgebase, <http://www.petri.co.il/virtual_vmware_files_explained.htm>, May 3, 2008, 3 pages.

Davis, D., "VMware Versions Compared," Petri IT Knowledgebase, <http://www.petri.co.il/virtual_vmware_versions_compared.htm>, Nov. 16, 2007, 3 pages.

Deng, et al., "Fast Saving and Restoring Virtual Machines with Page Compression", 2011, pp. 150-157.

Diallo, Ousmane, et al. "Distributed database management techniques for wireless sensor networks." IEEE Transactions on Parallel and Distributed Systems 26.2 (2013): pp. 604-620. (Year: 2013).

Eldos Callback File System product information from https://www.eldos.com/clients/104-345.php retrieved on Dec. 30, 2016, in 2 pages.

Eldos Usermode filesystem for your Windows applications—Callback File System® (CBFS®)—Create and manage virtual

(56) References Cited

OTHER PUBLICATIONS filesystems and disks from your Windows applications retrieved from https://eldos.com/cbfs on Dec. 30, 2016 in 4 pages.
Fraser et al., "Safe Hardware Access With the Xen Virtual Machine Monitor", 1st Workshop on Operating System and Architectural Support for the demand IT Infrastructure (OASIS), 2004, pp. 1-10.
Fu et al., "Fine Grained Transaction Log for Data Recovery in Database Systems", Third Asia-Pacific Trusted Infrastructure Technologies Conference, IEEE, 2008, pp. 123-131.
Gait, "The Optical File Cabinet: A Random-Access File System for Write-Once Optical Disks," IEEE Computer, vol. 21, No. 6, pp. 11-22 (Jun. 1988) (see in particular figure 5 in p. 15 and recitation in claim 5).
Galan et al. "Service Specification in Cloud Environments Based on Extension to Oper Standards" COMSWARE Jun. 16-19, 2009 Dublin, Ireland ACM.
Gibson, et al., "Implementing Preinstallation Environment Media for Use in User Support," 2007, pp. 129-130.
Gorton, Ian, and John Klein. "Distribution, data, deployment: Software architecture convergence in big data systems." IEEE Software 32.3 (2014): pp. 78-85. (Year: 2014).
Granger, et al., "Survivable Storage Systems", 2001, pp. 184-195.
Gupta, et al., "GPFS-SNC: An enterprise storage framework for virtual-machine clouds", 2011, pp. 1-10.
Haselhorst, et al., "Efficient Storage Synchronization for Live Migration in Cloud Infrastructures", 2011, pp. 511-518.
Hirofuchio, Takahiro et al., "A live storage migration mechanism over wan and its performance evaluation," 2009, pp. 67-74.
Hirofuchi, et al., "Enabling Instantaneous Relocation of Virtual Machines with a Lightweight VMM Extension", 2010, pp. 73-83.
Hu, et al., "Virtual Machine based Hot-spare Fault-tolerant System", 2009, pp. 429-432.
Hu, Wenjin et al., "A Quantitative Study of Virtual Machine Live Migration," 2013, pp. 1-10.
Huff, "Data Set Usage Sequence Number," IBM Technical Disclosure Bulletin, vol. 24, No. 5, Oct. 1981 New York, US, pp. 2404-2406.
Ibrahim, Shadi et al., "CLOUDLET: Towards MapReduce Implementation on Virtual Machines," 2009, pp. 65-66.
Ismail et al., Architecture of Scalable Backup Service for Private Cloud, IEEE 2013, pp. 174-179.
Jander, "Launching Storage-Area Net," Data Communications, US, McGraw Hill, NY, vol. 27, No. 4 (Mar. 21, 1998), pp. 64-72.
Javaraiah, et al., "Backup for Cloud and Disaster Recovery for Consumers and SMBs," 2008, pp. 1-3.
Jhawar et al., "Fault Tolerance Management in Cloud Computing: A System-Level Perspective", IEEE Systems Journal, vol. 7, No. 2, 2013, pp. 288-297.
Jo, et al., "Efficient Live Migration of Virtual Machines Using Shared Storage", 2013, pp. 1-10.
Kashyap "RLC—A Reliable approach to Fast and Efficient Live Migration of Virtual Machines in the Clouds" IEEE 2014 IEEE Computer Society.
Kim, et al., "Availability Modeling and Analysis of a Virtualized System," 2009, pp. 365-371.
Kuo, et al., "A Hybrid Cloud Storage Architecture for Service Operational High Availability", 2013, pp. 487-492.
Li et al. "Comparing Containers versus Virtual Machines for Achieving High Availability" 2015 IEEE.
Liang, et al., "A virtual disk environment for providing file system recovery", 2006, pp. 589-599.
Lu et al., "Virtual Machine Memory Access Tracing with Hypervisor Exclusive Cache", Usenix Annual Technical Conference, 2007, pp. 29-43.
Mao, et al., "Read-Performance Optimization for Deduplication-Based Storage Systems in the Cloud", 2014, pp. 1-22.
Microsoft Corporation, "How NTFS Works," Windows Server TechCenter, <http://technet2.mircrosoft.com/windowsserver/en/library/8cc5891d-bf8e-4164-862d-dac5418c5948 . . . >, updated Mar. 28, 2003, internet accessed Mar. 26, 2008, 26 pages.
Migrate a Virtual Machine with Storage vMotion in the vSphere Client. http://pubs.vmware.com/vsphere-51/advanced/print/jsp?topic=/com.vmware.vsphere.vcent . . . Retrieved Aug. 12, 2014; 2 pages.
Nance et al., "Virtual Machine Introspection: Observation or Interference?", 2008 IEEE.
Ng, Chun-Ho et al., "Live Deduplication Storage of Virtual Machine Images in an Open-Source Cloud," 2011, pp. 80-99.
Nicolae, Bogdan et al., "A Hybrid Local Storage Transfer Scheme for Live Migration of 1/0 Intensive Workloads," 2012, pp. 85-96.
Reingold, B. et al., "Cloud Computing: The Intersection of Massive Scalability, Data Security and Privacy (Part I)," LegalWorks, a Thomson Business, Jun. 2009, 5 pages.
Reingold, B. et al., "Cloud Computing: Industry and Government Developments (Part II)," LegalWorks, Sep. 2009, 5 pages.
Reingold, B. et al., "Cloud Computing: Whose Law Governs the Cloud? (Part III)," LegalWorks, Jan.-Feb. 2010, 6 pages.
Sanbarrow.com, "Disktype-table," <http://sanbarrow.com/vmdk/disktypes.html>, internet accessed on Apr. 30, 2014, 4 pages.
Sanbarrow.com, "Files Used by a VM," <http://sanbarrow.com/vmx/vmx-files-used-by-a-vm.html>, internet accessed on Apr. 30, 2014, 1 page.
Sanbarrow.com, "Monolithic Versus Split Disks," <http://sanbarrow.com/vmdk/monolithicversusspllit.html>, internet accessed on Jul. 14, 2008, 2 pages.
Somasundaram et al., Information Storage and Management. 2009, pp. 251-281.
Terry, Douglas B., et al. "Managing update conflicts in Bayou, a weakly connected replicated storage system." ACM SIGOPS Operating Systems Review 29.5 (1995): pp. 172-182. (Year: 1995).
Tran, et al., "Efficient Cooperative Backup with Decentralized Trust Management", 2012, pp. 1-25.
Travostino, et al., "Seamless live migration of virtual machines over the MAN/WAN", 2006, pp. 901-907.
Tudoran, Radu et al., "Adaptive File Management for Scientific Workflows on the Azure Cloud," 2013, pp. 273-281.
Vaghani, "Virtual Machine File System", 2010, pp. 57-70.
VMware, Inc., "VMware Solution Exchange (VSX)" <http://www.vmware.com/appliances/learn/ovf.html>, 2014, 3 pages.
VMware, Inc., "OVF, Open Virtual Machine Format Specification, version 0.9," White Paper, <http://www.vmware.com>, Sep. 7, 2007, 50 pages.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, accessed Apr. 30, 2014, 11 pages.
VMware, Inc., "Using VMware Infrastructure for Backup and Restore," Best Practices, <http://www.vmware.com>, accessed Apr. 30, 2014, 20 pages.
VMware, Inc., "Virtual Disk API Programming Guide," <http://www.vmware.com>, Revision 20080411, 2008, 44 pages.
VMware, Inc., "Virtual Disk Format 1.1," VMware Technical Note, <http://www.vmware.com>, Revision 20071113, Version 1.1, 2007, 18 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "Virtual Machine Backup Guide, ESX Server 3.5, ESX Server 3i version 3.5, VirtualCenter2.5," <http://www.vmware.com>, updated Feb. 21, 2008, 78 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "VMware Consolidated Backup," Product Datasheet, <http://www.vmware.com>, 2009, 2 pages.
VMware, Inc., "VMware Consolidated Backup, Improvements in Version 3.5," Information Guide, <http://www.vmware.com>, accessed Apr. 30, 2014, 11 pages.
VMware, Inc., "VMware ESX 3.5," Product Datasheet, <http://www.vmware.com>, 2008, 4 pages.

(56) References Cited

OTHER PUBLICATIONS

VMware, Inc., "VMware GSX Server 3.2, Disk Types: Virtual and Physical," <http://www.vmware.com/support/gsx3/doc/disks_types_gsx.html>, 2008, 2 pages.

VMware, Inc., "VMware OVF Tool," Technical Note, <http://www.vmware.com>, 2007, 4 pages.

VMware, Inc., "VMware Workstation 5.0, Snapshots in a Process Tree," <http://www.vmware.com/support/ws5/doc/ws_preserve_sshot_tree.html>, accessed Apr. 30, 2014, 1 page.

VMware, Inc., "VMware Workstation 5.0, Snapshots in a Linear Process," <http:/www.vmware.com/support/ws5/doc/ws_preserve_sshot_linear.html>, internet accessed on 2014, 1 page.

VMware, Inc., "VMware Workstation 5.5, What Files Make Up a Virtual Machine?" <http://www.vmware.com/support/ws55/doc/ws_learning_files_in_a_vm.html>, 2014, 2 pages.

VMware Storage VMotion—Non-Disruptive Live Migration for Virtual Machine Storage Disk Files. Copyright 2009 VMware, Inc.; 2 pages.

Vrable, et al., "Cumulus: Filesystem Backup to the Cloud", 2009, pp. 1-28.

VSphere Storage vMotion: Storage Management & Virtual Machine Migration.

Weil, Sage A., et al. "CRUSH: Controlled, scalable, decentralized placement of replicated data." SC'06: Proceedings of the 2006 ACM/IEEE Conference on Supercomputing. IEEE, 2006. pp. 1-12 (Year: 2006).

Wikipedia, "Cloud computing," <http://en.wikipedia.org/wiki/Cloud-computing>, 2009, 11 pages.

Wikipedia, "Cluster (file system)," <http://en.wikipedia.org/wiki/Cluster_%28file_system%29>, Sep. 2, 2008, 1 page.

Wikipedia, "Cylinder-head-sector," <http://en.wikipedia.org/wiki/Cylinder-head-sector>, Jan. 4, 2009, 6 pages.

Wikipedia, "File Allocation Table," <http://en.wikipedia.org/wiki/File_Allocation_Table>, Dec. 3, 2008, 12 pages.

Wikipedia, "Logical Disk Manager," <http://en.wikipedia.org/wiki/Logical_Disk_Manager>, Nov. 16, 2007, 3 pages.

Wikipedia, "Logical Volume Management," <http://en.wikipedia.org/wiki/Logical_volume_management>, Oct. 27, 2008, 3 pages.

Wikipedia, "Storage Area Network," <http://en.wikipedia.org/wiki/Storage_area_network>, Dec. 5, 2008, 5 pages.

Wikipedia, "Virtualization," <http://en.wikipedia.org/wiki/Virtualization>, Apr. 29, 2014, 7 pages.

Wood, et al., "Disaster Recovery as a Cloud Service: Economic Benefits & Deployment Challenges", 2010, pp. 1-7.

Yang, et al., "Toward Reliable Data Delivery for Highly Dynamic Mobile Ad Hoc Networks," 2012, pp. 111-124.

Yang, et al., "TRAP-Array: A Disk Array Architecture Providing Timely Recovery to Any Point-in-time," 2006, pp. 1-12.

Yoshida et al., "Orthros: A High-Reliability Operating System with Transmigration of Processes," 2013, pp. 318-327.

Zhao, et al., "Adaptive Distributed Load Balancing Algorithm based on Live Migration of Virtual Machines in Cloud", 2009, pp. 170-175.

Zhao, et al., Supporting Application-Tailored Grid File System Sessions with WSRF-Based Services, Advanced Computing and Information Systems Laboratory (ACIS), pp. 24-33.

International Search Report and Written Opinion for PCT/US2011/054374, dated May 2, 2012, 7 pages.

International Preliminary Report on Patentability and Written Opinion for PCT/US2011/054374, dated Apr. 2, 2013, 9 pages.

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society international Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Levy et al., "Log-Driven Backups: A Recovery Scheme for Large Memory Database Systems", IEEE 1990, pp. 99-109.

IBM Technical Disclosure Bulletin, vol. 24, No. 5, Oct. 1981 New York, US, pp. 2404-2406, K.L. Huff, "Data Set Usage Sequence Number".

Rosenblum et al., "The Design and Implementation of a Log-Structure File System," Operating Systems Review SIGOPS, vol. 25, No. 5, New York, US, pp. 1-15 (May 1991).

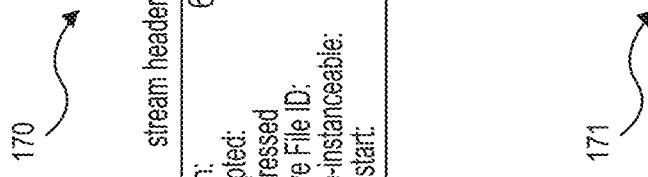

INFORMATION MANAGEMENT BY A MEDIA AGENT IN THE ABSENCE OF COMMUNICATIONS WITH A STORAGE MANAGER

INCORPORATION BY REFERENCE TO ANY PRIORITY APPLICATIONS

This application is a Continuation of U.S. patent application Ser. No. 15/990,012 filed on May 25, 2018, which is a Continuation of U.S. patent application Ser. No. 15/377,837 filed on Dec. 13, 2016, which is a Continuation of U.S. patent application Ser. No. 14/271,311, filed on May 6, 2014 and patented as U.S. Pat. No. 9,563,518 B2, which claims priority to U.S. Provisional Patent Application No. 61/974,181, filed on Apr. 2, 2014. Any and all applications for which a foreign or domestic priority claim is identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization. A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc. Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

SUMMARY

Protecting data, even in a properly designed information management system, is challenging when the key storage manager component becomes unavailable, whether due to poor connectivity or because of a catastrophic failure at the storage manager. In such a scenario, the management database comprising system-level information upon which the storage manager relies to manage the information management system, is also unavailable. For example, unreliable and/or intermittent connections between a storage manager and certain other components (e.g., client and media agent) may disrupt the ability of an information management system to protect data, e.g., to timely generate and properly store secondary copies of production data. Furthermore, large sprawling information management systems comprising scores of dispersed clients and associated media agents tend to burden a storage manager's processing capacity when it must retry and/or resend to overcome unreliable infrastructure and spotty connectivity. To properly protect data under such conditions, the present inventor devised systems and methods for pro-actively protecting information while the client and associated media agent are disconnected from (or otherwise out of communication with) the storage manager. For example, in case the storage manager is not reachable, backups for certain clients and subclients may continue and complete and even new backups may kick off without any connectivity to the storage manager at all.

Accordingly, an illustrative media agent performs substantially autonomously to protect primary data (or other data) so that the results may be seamlessly integrated by the storage manager into its management information infrastructure. The media agent enjoys substantial autonomy, when the media agent and the client are out of communication with the storage manager, to initiate information management operations (e.g., a backup job of a certain client's primary data), continue ongoing operations that were initiated by the storage manager, manage the operations, and generate and store resultant system-level metadata from the operations, etc. Because the media agent generates "system-level" metadata and reports it to the storage manager, the information management operations that occurred absent the storage manager may be seamlessly integrated, e.g., into the management database associated with the storage manager. For example, job completion/failure statistics, which are generally tracked by the storage manager, may now include these new media-agent-managed operations. Unlike prior art solutions that rely on redundant componentry (e.g., a standby storage manager) or redundant connectivity (e.g., alternate routing), the illustrative solution efficiently leverages the installed media agent component. Also, unlike prior art solutions where restore operations or disaster recovery may be possible without involving the storage manager, the illustrative solutions are directed at pro-actively protecting data in the first place, i.e., initiating, continuing, and managing information management jobs such as backups, including key features such as content indexing, encryption, compression, deduplication, etc. Accordingly, the illustrative information management system is more robust and better able to protect portions of primary data (or other data) in whole or in part even under relatively adverse conditions.

The illustrative media agent, comprising specialized executable logic, comprises management parameters, which may be received from the storage manager. The management parameters may include, for example, information management policies, e.g., storage policies, that govern the media agent's autonomous information management operations. For example, in the case of a storage policy governing backup for one or more subclients, the illustrative media agent generates and stores secondary copies of the client's production data, and also generates metadata to be transmitted to, and integrated by, the storage manager (e.g., metadata identifying the client/subclient and the primary data that was protected by the backup job). Secondary copies of non-primary data also may be generated, e.g., auxiliary copies, tertiary copies, etc., as specified in the management parameters. When communications are restored, the media agent reports the relevant metadata to the storage manager. The storage manager comprises corresponding enhancements, including specialized logic for identifying the media agent as an intelligent media agent capable of some autonomous functionality, for transmitting management parameters thereto, and for seamlessly integrating the received metadata into the storage manager's associated management infrastructure such as a management database.

BRIEF DESCRIPTION OF THE DRAWINGS

FIGS. 1F-1H are block diagrams illustrating suitable data structures that may be employed by the information management system.

DETAILED DESCRIPTION

Systems and methods are disclosed for information management, which are performed substantially autonomously by a media agent in the absence of communications with a storage manager, illustratively in the context of information management system 300. Examples of such systems and methods are explained and described in further detail herein, with particular reference to FIGS. 2 through 6. The components and functionality of system 300 may be configured and/or incorporated into information management systems such as those described herein in FIGS. 1A-1H and 2.

In contrast to more traditional solutions that employ additional failover components of the same type to backstop a failure in a certain type of component (see, e.g., U.S. Pat. No. 8,504,526 B2, which is incorporated by reference in its entirety herein), the illustrative solution efficiently leverages the installed media agent component.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
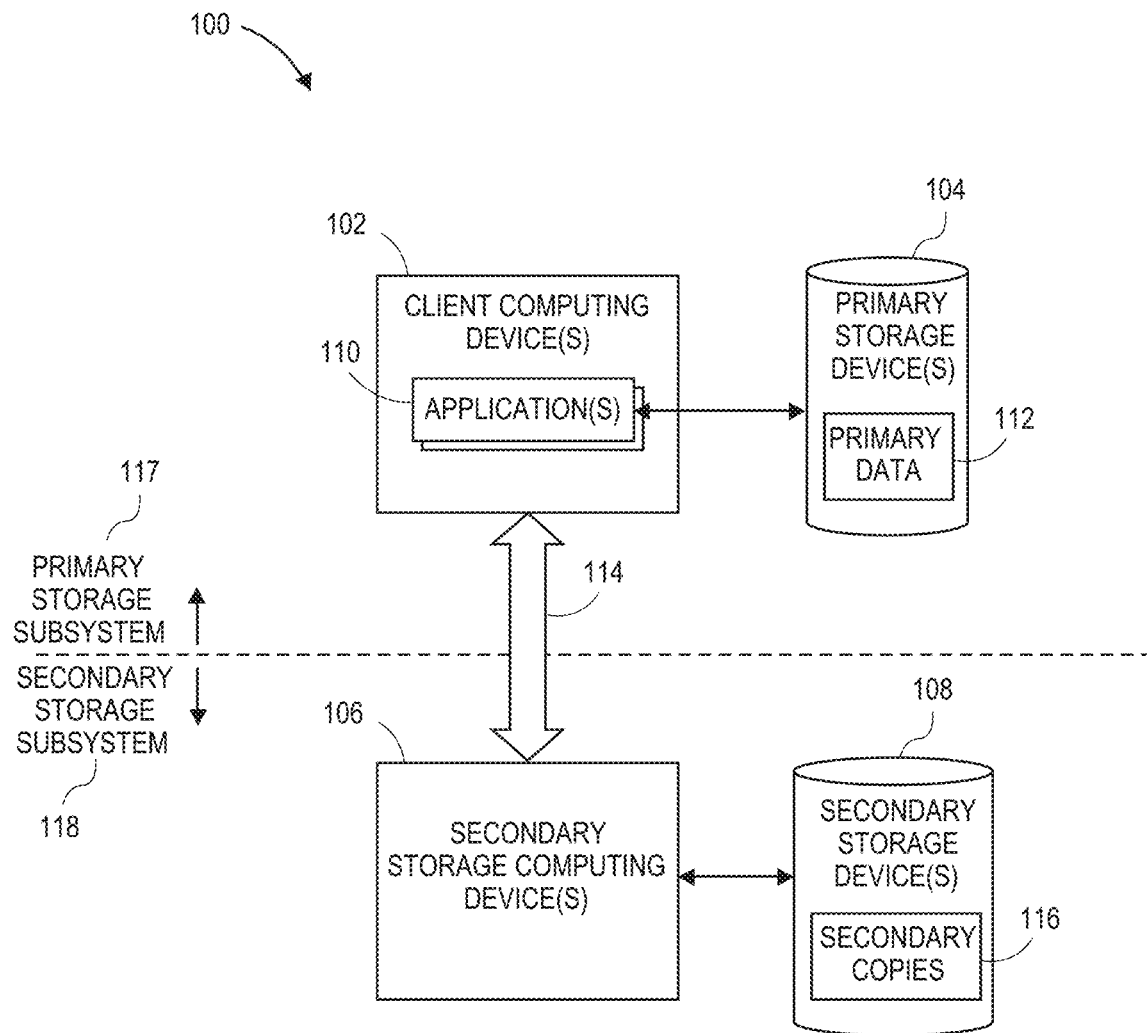
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 7,035,880, entitled "Modular Backup and Retrieval System Used in Conjunction With a Storage Area Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,246,207, entitled "System and Method for Dynamically Performing Storage Operations in a Computer Network";
- U.S. Pat. No. 7,747,579, entitled "Metabase for Facilitating Data Classification";
- U.S. Pat. No. 8,229,954, entitled "Managing Copies of Data";
- U.S. Pat. No. 7,617,262, entitled "System and Methods for Monitoring Application Data in a Data Replication System";
- U.S. Pat. No. 7,529,782, entitled "System and Methods for Performing a Snapshot and for Restoring Data";
- U.S. Pat. No. 8,230,195, entitled "System And Method For Performing Auxiliary Storage Operations";
- U.S. Pat. No. 7,315,923, entitled "System And Method For Combining Data Streams In Pipelined Storage Operations In A Storage Network";
- U.S. Pat. No. 8,364,652, entitled "Content-Aligned, Block-Based Deduplication";
- U.S. Pat. Pub. No. 2006/0224846, entitled "System and Method to Support Single Instance Storage Operations";
- U.S. Pat. No. 8,578,120, entitled "Block-Level Single Instancing";
- U.S. Pat. Pub. No. 2009/0319534, entitled "Application-Aware and Remote Single Instance Data Management";
- U.S. Pat. Pub. No. 2012/0150826, entitled "Distributed Deduplicated Storage System";

U.S. Pat. Pub. No. 2012/0150818, entitled "Client-Side Repository in a Networked Deduplicated Storage System";

U.S. Pat. No. 8,170,995, entitled "Method and System for Offline Indexing of Content and Classifying Stored Data";

U.S. Pat. No. 7,107,298, entitled "System And Method For Archiving Objects In An Information Store";

U.S. Pat. No. 8,230,195, entitled "System And Method For Performing Auxiliary Storage Operations";

U.S. Pat. No. 8,229,954, entitled "Managing Copies Of Data";

U.S. Pat. No. 8,156,086, entitled "Systems And Methods For Stored Data Verification"; and U.S. Pat. No. 8,504,526, entitled "Failover Systems and Methods for Performing Backup Operations".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114 that enable the respective endpoints to be in communication with each other. For example, a first communication pathway 114 may connect (or communicatively couple) client computing device 102 and secondary storage computing device 106, such that device 102 is in communication with device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
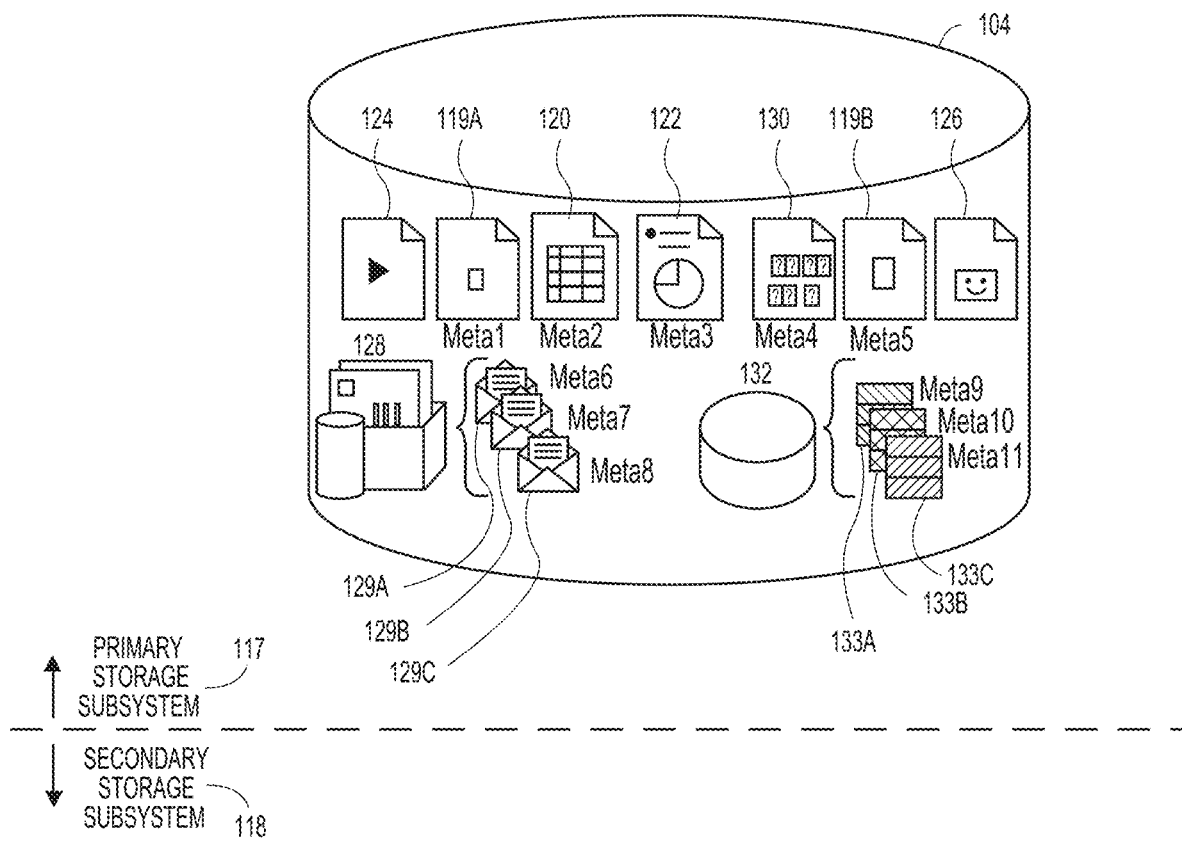
FIG. 1B is a detailed view of a primary storage device, a secondary storage device, and some examples of primary data and secondary copy data.
Figure 1B:
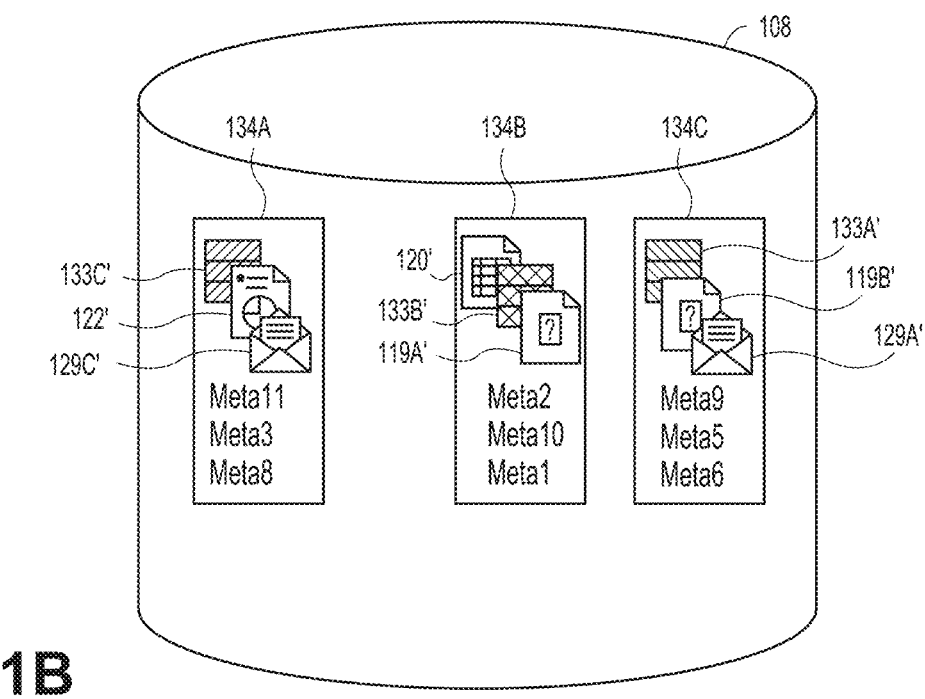

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
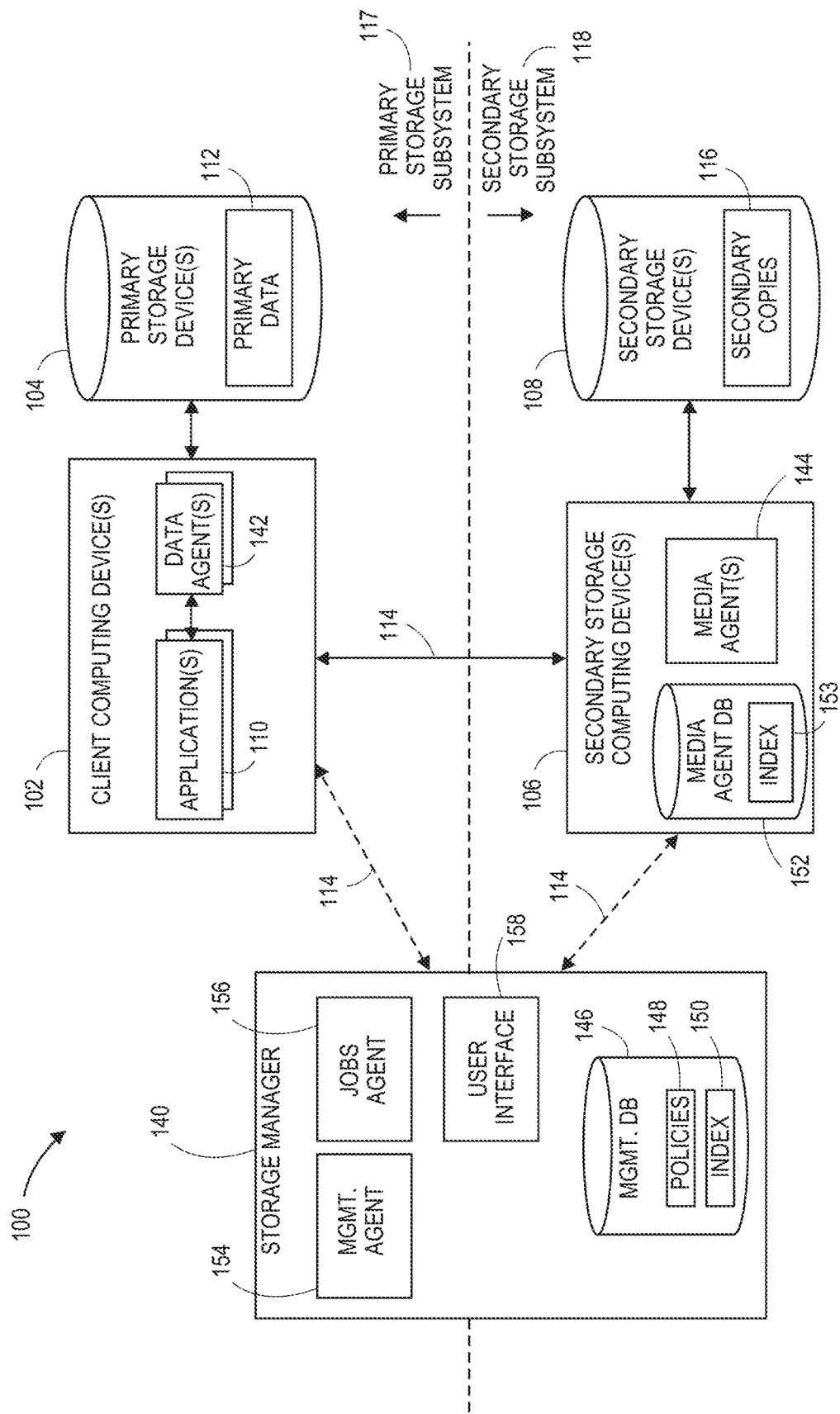
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 140 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
initiating execution of secondary copy operations;
managing secondary storage devices 108 and inventory/capacity of the same;

reporting, searching, and/or classification of data in the information management system 100;

allocating secondary storage devices 108 for secondary storage operations;

monitoring completion of and providing status reporting related to secondary storage operations;

tracking age information relating to secondary copies 116, secondary storage devices 108, and comparing the age information against retention guidelines;

tracking movement of data within the information management system 100;

tracking logical associations between components in the information management system 100;

protecting metadata associated with the information management system 100; and implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. In general, an information management system managed by a given storage manager may be referred to as a cell. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
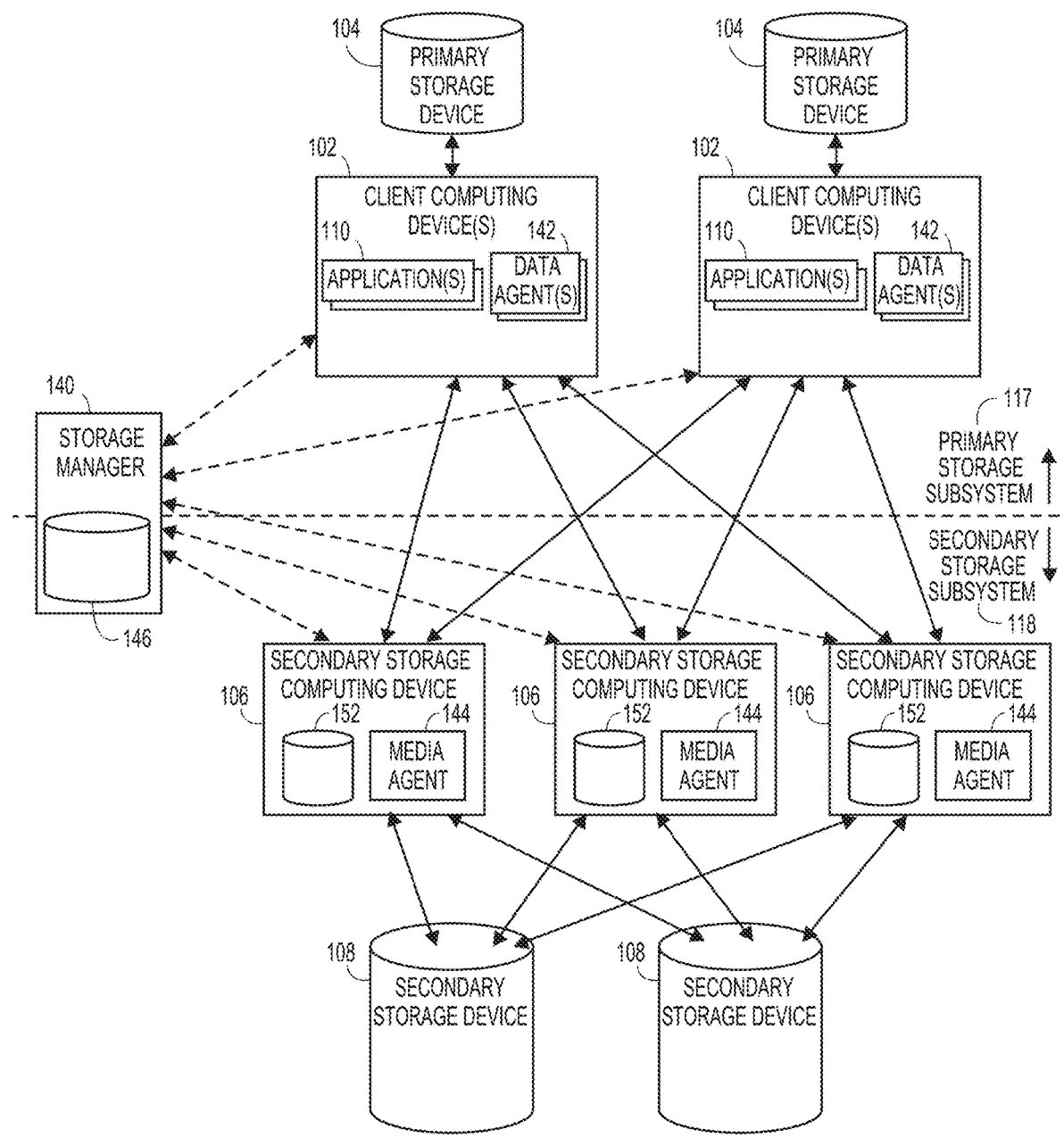
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
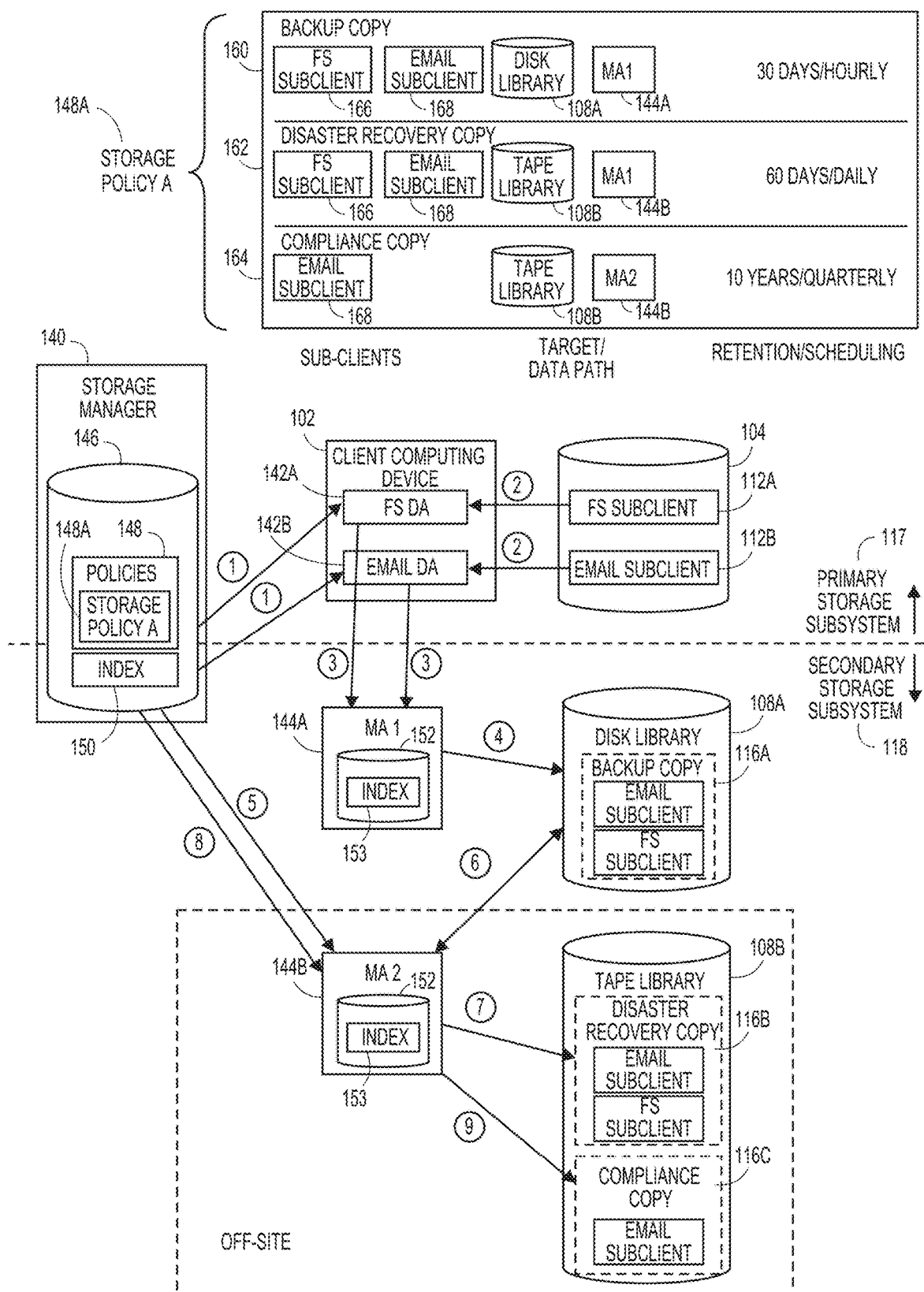
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with e-mail. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the e-mail data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
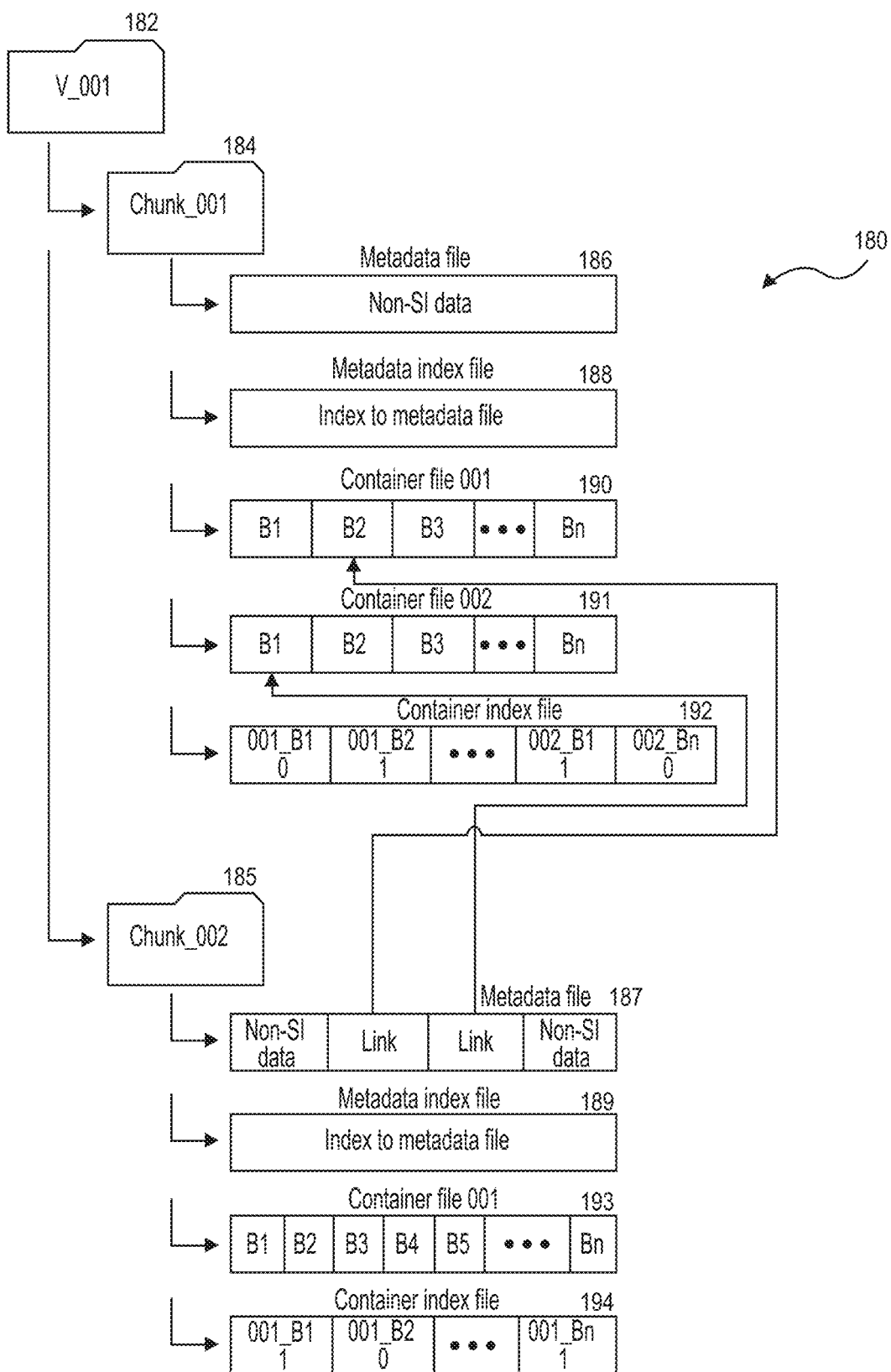

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Figure 2:
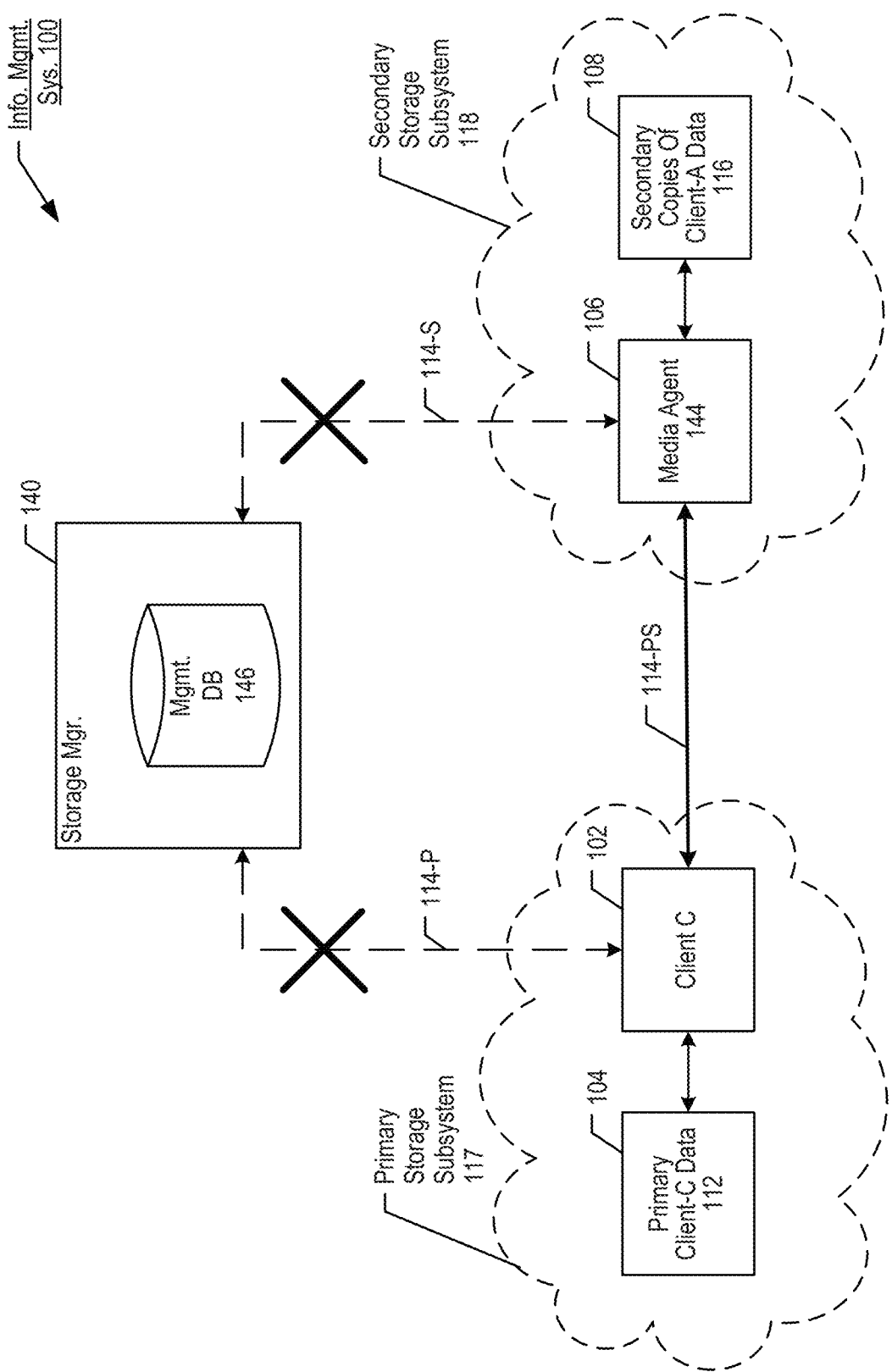
FIG. 2 is a block diagram depicting information management system 100 experiencing deficient connectivity/communications to/from storage manager 140.

Information Management by a Media Agent in the Absence of Communications with a Storage Manager FIG. 2 is a block diagram depicting information management system 100, which is characterized by deficient connectivity to/from storage manager 140. As depicted in FIG. 2, information management system 100 comprises: storage manager 140, which comprises management database 146; primary storage subsystem 117, which comprises client computing device 102 comprising client C, and primary storage device 104 comprising primary client-C data 112; and secondary storage subsystem 118, which comprises secondary storage computing device 106 comprising media agent 144, and secondary storage device 108 comprising secondary copy(ies) of client-C data 116 (as processed by media agent 144). As depicted by the dashed lines, communication path 114-P between storage manager 140 and client C, as well as communication path 114-S between storage manager 140 and media agent 144, both may be unavailable. For example, client C and its associated media agent 144 may be located in a geography that lacks reliable communications infrastructure and/or is subject to power outages. Consequently, communications to/from storage manager 140 are not always possible. Client C and media agent 144 are in communication with each other via communication path 114-PS.

Generally, for an information management job to be executed under the management of a storage manager, the media agent and client interact closely with the storage manager to receive instructions. For example, when it is time for a storage policy to be executed, the storage manager may instruct the client to kick off a certain information management job, including transmitting to the client a job ID and instructions on what data to back up and how, what data to filter in/out of the job, folder identifiers, the destination media agent that will process the job, etc. More instructions are transmitted with the next job. The client is thus guided by the storage manager. For example, to execute storage policy 148A using rule set 160 (see FIG. 1E), storage manager 140 might first detect that it is time to invoke the policy (e.g., hourly); storage manager 140 might then instruct client C to connect to media agent 144A; storage manager 140 might then instruct the client to launch a backup copy of a file system subclient 166 and an email subclient 168 (including appropriate formatting and/or transmission parameters, etc.); storage manager 140 might further instruct that the job be transmitted to media agent 144A, and to use secondary storage device 108A for the backup copy (e.g., instruct client C and/or media agent 144A to use device 108A).

In communicating with the respective media agent, e.g., 144A, storage manager 140 may instruct it as to how the information management job is to be performed, e.g., whether to encrypt, compress, deduplicate, etc. and where the resultant data is to be stored, e.g., secondary storage device 108. The media agent is thus guided by the storage manager. Therefore, when out of communication with the storage manager, the media agent's ability to generate and store secondary copies is compromised, regardless of whether it is in communication with client C. Therefore, a solution is needed to ensure that data protection operations may continue and kick off in an environment with generally poor connectivity and low network up-times.

Figure 3:
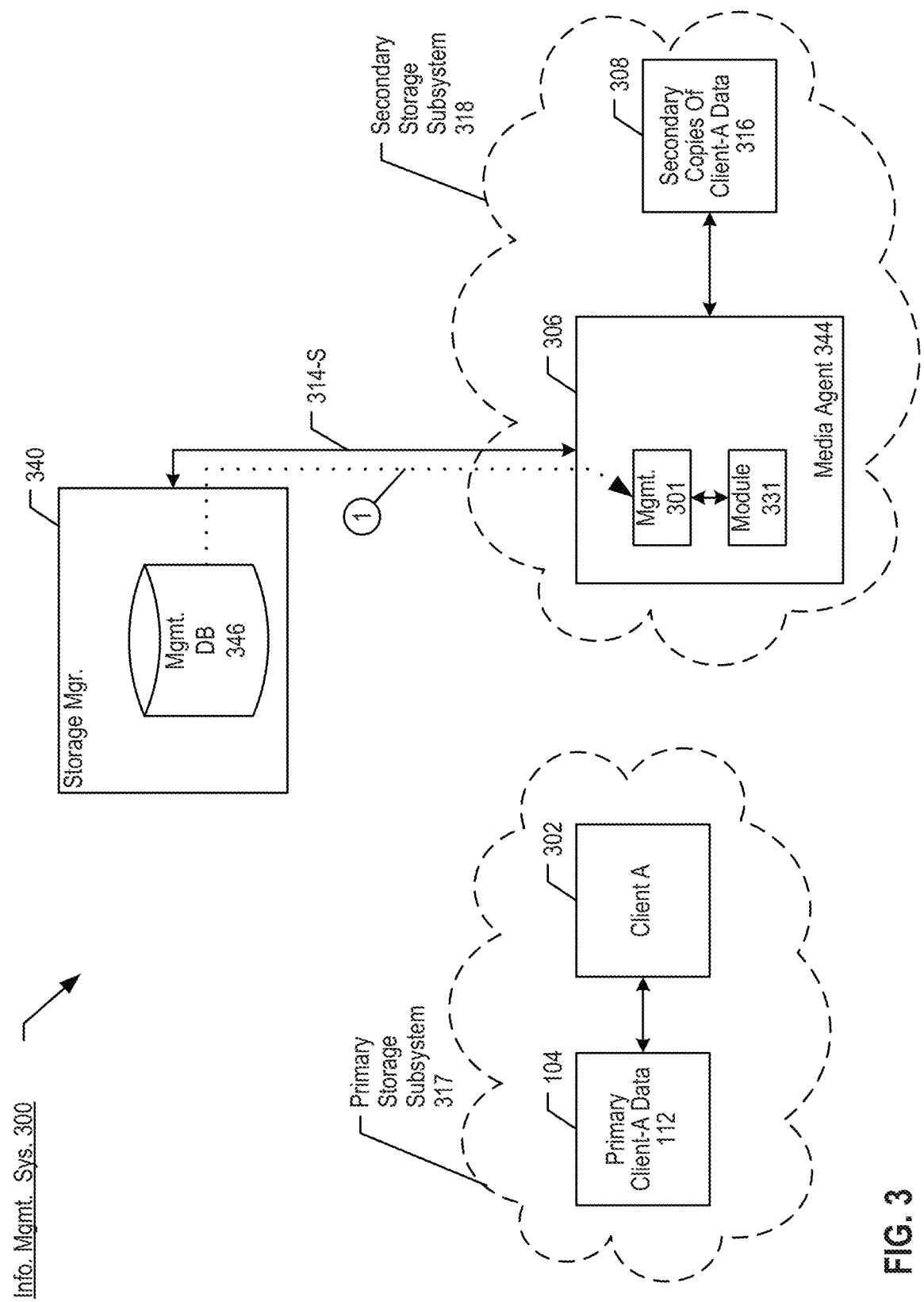
FIG. 3 is a block diagram illustrating some salient portions of a system 300, according to an illustrative embodiment of the present invention.

FIG. 3 is a block diagram depicting some salient components of information management system 300, according to an illustrative embodiment of the present invention, including: storage manager 340, which comprises management database 346; primary storage subsystem 317, which comprises client computing device 302 comprising client A, and primary storage device 104, which comprises primary client-A data 112; and secondary storage subsystem 318, which comprises secondary storage computing device 306 comprising media agent 344, and secondary storage device 308 comprising secondary copy(ies) of client-A data 316. FIG. 3 also depicts part of a logical flow (dotted line), which illustrates how commands and data flow through information management system 300 according to the illustrative embodiment. The logical flow continues in subsequent figures.

Data structure 301, which is part of media agent 344, logically comprises management parameters such as storage policies, other information management policies, operational parameters, configuration parameters, timing parameters, etc. Data structure 301 may take the form of one or more actual storage locations in secondary storage computing device 306 and/or in associated local storage. Such management parameters may be used by media agent 344 to operate in the absence of communications with storage manager 340.

Client computing device 302 is a computing device analogous to client computing device 102, and further comprises one or more data agents as shown in subsequent figures, thus comprising client A.

Secondary storage computing device 306 is a computing device analogous to secondary storage computing device 106, and comprises media agent 344, which is described in more detail below.

Secondary storage device 308 is a secondary storage device analogous to storage device 108, and comprises one or more secondary copies of client-A data, as processed by media agent 344, and collectively designated secondary copies 316. Any number of secondary storage devices 308 may be in communication with media agent 344, respectively comprising any number/type of different media, e.g., disk, tape, etc.

Communication path 314-S is a communication pathway between storage manager 340 and media agent 344 according to the illustrative embodiment. Communication path 314-S may comprise any and all types of infrastructure described above in regard to communication pathways 114. Unlike communication pathways 114, however, communication path 314-S may carry a different message set, as described in further detail below. Communication path 314-S may be unavailable at times, but may be available intermittently or on a schedule, e.g., at certain times of day. When a communication path such as 314-S is not available, the endpoints are said to be "out of communication with" each other, or in some contexts, disconnected from each other or lacking connectivity.

Primary storage subsystem 317 logically comprises storage device 104 and client computing device 302, which were described above.

Secondary storage subsystem 318 logically comprises secondary storage computing device 306 and secondary storage device 308, which were described above.

Functional module 331 is part of media agent 344. When it executes according to the illustrative embodiment, functional module 331 is largely responsible for performing the functionality of media agent 344 as described herein. Functional module 331 may be embodied as a unified module and/or layer on existing media agent code, or, in some embodiments, may be a logical construct whose functionality is distributed through one or more other functional modules of the media agent. For example, module 331 may recognize that communications with the storage manager are down, and may therefore process certain messages received from a client and/or from another function of the media agent, rather than transmit them to the storage manager. Module 331 may also override certain messages, e.g., marking jobs complete, job updates, creating chunks, archiving files, etc., without limitation.

Storage manager 340 is a storage manager analogous to storage manager 140 that may comprise an enhanced message set for communicating to and from media agent 344. Storage manager 340 may also comprise additional information and/or associated data structures for identifying media agent 344 as an "intelligent media agent," which is configured to operate substantially autonomously when out of communication with storage manager 340, such information illustratively stored in management database 346.

Management database 346 is a management database analogous to management database 146 and logically comprises data which is used by storage manager 340 to manage system 300 as a whole, and specifically for managing relevant information management operations at media agent 344 and client A as components of information management system 300. For example, information management policies such as storage policies are stored in management database 346. Illustratively, media agent 344's jobs (e.g., scheduled, performed, failed, errored, etc.) are monitored and tracked, such that the information is stored, maintained, and updated by the storage manager in management database 346 and/or in another associated data structure (not shown).

It is to be understood that information management system 300 is not limited to the components illustrated in the present figure. For example, information management system 300 may comprise any number of secondary storage computing devices 306, each comprising one or more media agents, and any number of secondary storage devices 308, each comprising any number and/or configurations of secondary data from one or more clients of information management system 300. Thus, any combination and geographic distribution of secondary storage computing devices 106 and 306 and corresponding media agent 144 and media agent 344 are possible within the scope of the present invention.

At step 1 (dotted line), the first of a multi-step logical flow, media agent 344 is in communication with storage manager 340 via communication path 314-S This may occur on a known schedule (e.g., daily, weekly, etc.) or intermittently, as communications infrastructure becomes available and operational. Module 331, e.g., upon detecting that communication path 314-S is active, requests (or "pulls") appropriate management parameters from storage manager 340. In some alternative embodiments, transmission of the management parameters may be initiated (or "pushed") by the storage manager to media agent 344. In some embodiments, at least some of the management parameters are pre-administered into media agent 344. Primary storage subsystem 317 component(s), e.g., client A, may or may not be in communication with storage manager 340 and/or media agent 344 at step 1. Step 1 may occur independently of whether or not media agent 344 is in communication with a client, or whether it is currently performing an information management job, e.g., a backup from client A, a restore to client A, etc.

The received management parameters are stored in data structure 301. Illustratively, the received management parameters comprise information management policies, including storage policies for backup, for one or more subclients of client A and other clients associated with media agent 344. Storage manager 340 may comprise logic or administrative parameters for determining which clients/subclients (and corresponding data agents) may be supported by the present management parameters; for example, some lower-priority subclients or primary data may not be supported, in favor of other higher priority ones. Storage policy 148A having rule set 160 for generating backup copies (see, e.g., FIG. 1E), may be an example of an information management policy received by media agent 344 and stored in data structure 301.

In some embodiments, step 1 may comprise the media agent 344 "leasing" management information from the storage manager in anticipation of autonomous operation. The "leased" information may include information management policies, e.g., a storage policy; and/or a certain range of information management job IDs. Step 1 may occur in anticipation of a loss of communications between media agent 344 and storage manager 340, and may also include management parameters pertaining to a currently occurring information management job (e.g., a job in progress), or in some embodiments may be limited to future operations.

Step 1 may further comprise receiving additional information needed by media agent 344, such as the timing of when storage manager 340 may next be available to communicate with. The management parameters may also include network topography and/or addressing information in reference to certain clients and/or subclients, information that the substantially autonomous media agent 344 needs to communicate to/from the primary storage subsystem, e.g., to client A. For example, media agent 344 may need to know how to initiate a backup job of a certain subclient at client A—information that is received illustratively at step 1.

After receiving the management parameters and storing them appropriately, e.g., in data structure 301, media agent 344 may now pro-actively disconnect from storage manager 340, or otherwise survive the failure of communication path 314-S, and operate substantially autonomously while out of communication with the storage manager until communications are restored. During substantially autonomous operation, media agent 344 illustratively takes over from the storage manager the management (at least in part) of protecting primary data generated in the primary storage subsystem 317. The extent of protection and the scope of protected data will vary according to different implementations. For example, in some embodiments, only backup (and corresponding restore) operations are supported autonomously by media agent 344, e.g., backup with deduplication to magnetic media. In other embodiments, other operations may be supported, e.g., making disaster recovery copies, making compliance copies, data aging, making auxiliary copies, making synthetic full copies, etc., without limitation. Further steps in the illustrative work flow are described in subsequent figures.

Figure 4:
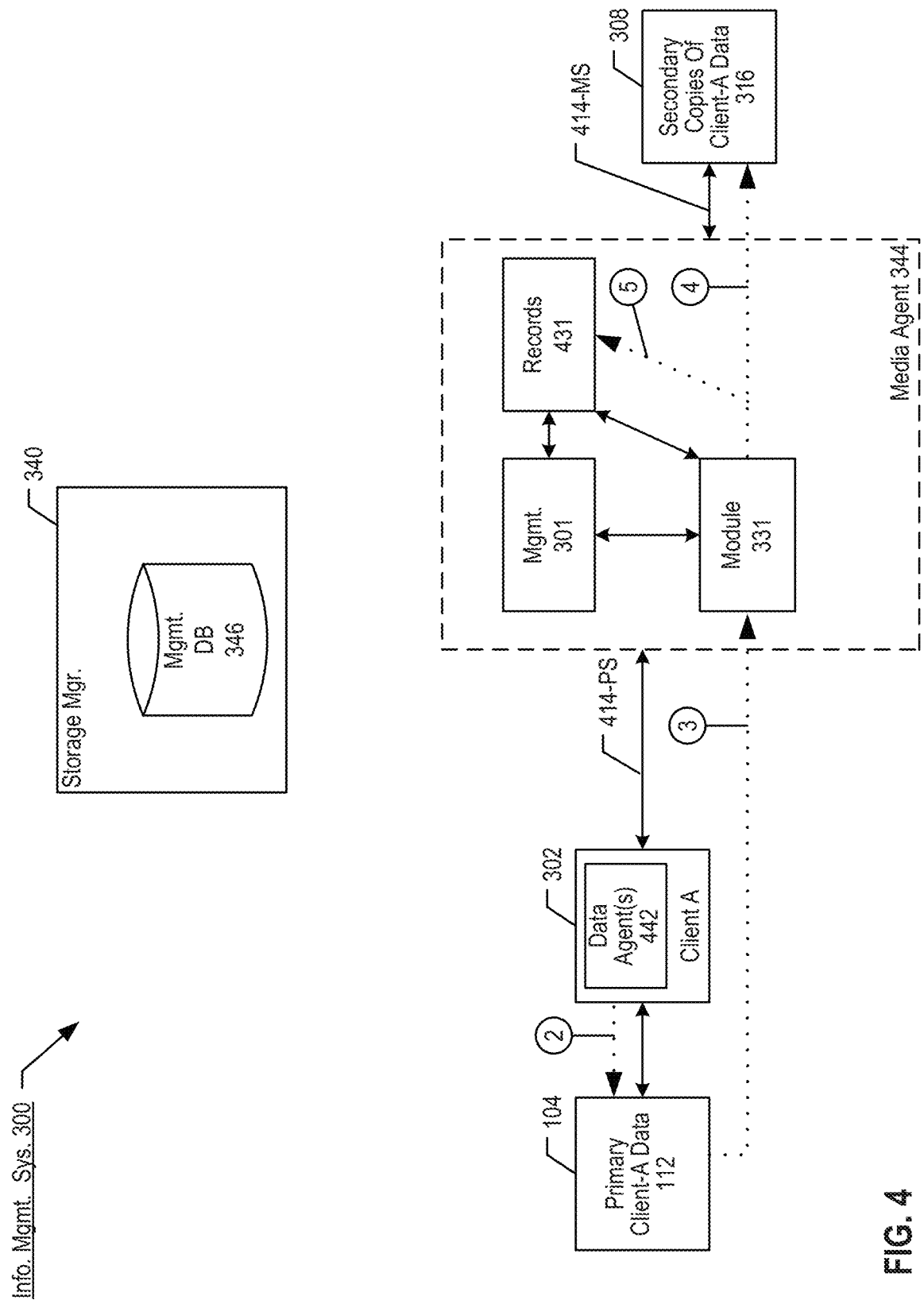
FIG. 4 is a block diagram depicting some salient elements of information management system 300.

FIG. 4 is a block diagram depicting some salient elements of information management system 300, including: primary storage device 104 comprising primary client-A data 112; client computing device 302 comprising data agents 442; secondary storage device 308 comprising secondary copies 316; communication path 414-MS between secondary storage device 308 and media agent 344; media agent 344, which comprises data structure 301, module 331, and data structure 431; and communication path 414-PS between media agent 344 and client A. Communications to/from storage manager 340 are down in the present figure, and therefore media agent 344 is shown here performing substantially autonomously. FIG. 4 depicts parts of the logical flow begun in FIG. 3 (dotted lines, steps 2-5), which illustrates how commands and data flow through information management system 300 according to the illustrative embodiment.

Communication path 414-MS is a communication pathway between media agent 344 and secondary storage device 308. Communication path 414-MS may comprise any and all types of infrastructure described above in regard to communication pathways 114. Any number of secondary storage devices 308 may be connected to a given media agent 344, each having a respective communication path 414-MS.

Communication path 414-PS is a communication pathway between media agent 344 and client A. Communication path 414-PS may comprise any and all types of infrastructure described above in regard to communication pathways 114. Any number of client computing device(s) 302 (comprising a respective client A) may be associated with a given media agent 344, each having a respective communication path 414-MS.

Data structure 431 logically comprises information resulting from media agent 344's autonomous operation absent communications with storage manager 340, such as system-level metadata and/or other system-level information (collectively "records"). Data structure 431 may take the form of one or more actual storage locations in secondary storage computing device 306 and/or in other local storage associated with media agent 344; in some embodiments, data structure 431 is a logical construct such that the information therein is actually stored in one or more existing data structures, such as media agent database 152 and/or index cache 153 (not shown in the present figure). Regardless of physical form, the information in data structure 431 is generally to be reported to and/or permanently transferred to storage manager 340 after communications are restored. The information in data structure 431, regardless of form, is ultimately to be integrated (in whole or in part) by storage manager 340 into its information infrastructure for managing information management system 300. Examples are given below in regard to step 5.

Data agent(s) 442 execute on client computing device 302. Client A, which is a component of information management system 300, may refer to client computing device 302 executing any one (or collectively more than one) of the data agents. The illustrative embodiment may support any one or more types of data agent, including without limitation file system data agent(s), Microsoft SQL Server data agent(s), Oracle database data agents(s). In some embodiments, the data agent 442, in addition to the functionality described for data agent(s) 142, may be responsible for keeping track of job-ID ranges for successive information management jobs occurring while out of communications with the storage manager. A data agent 442 may also comprise information identifying media agent 344 as being associated with client A, and/or as an "intelligent" media agent capable of serving client A when client A loses communications with storage manager 340.

In some embodiments, the association between client A and media agent 344 may be persistent, whether or not client A is in communication with storage manager 340. Moreover, in some embodiments, communications between client A and storage manager 340 may be permanently routed through the associated "intelligent" media agent 344.

At step 2, client A generates production data, which is stored in primary storage device 104, in one or more data structures collectively designated primary client-A data 112. Client A generates production data regardless of whether it is in communication with storage manager 340 and/or media agent 344. Thus, step 2 may occur during, before, and/or after the performance of step 1, without limitation.

At step 3, media agent 344 is in communication with client A via communication path 414-PS, but is out of communication with storage manager 340; therefore, media agent 344 operates substantially autonomously, based at least in part on management parameters 301 and the execution of functional module 331. Accordingly, media agent 344 determines whether it is time for a governing information management policy, e.g., a storage policy in data structure 301, to invoke an information management operation, e.g., a backup job for a certain subclient of client A. If it so determines, media agent 344 initiates the job by requesting client A to begin—causing client A to pass data and its associated metadata (112) to the media agent. Media agent 344 receives primary client-A data 112 for processing. Media agent 344 also identifies the appropriate storage device and media to use for the operation, based on the information management policy.

Media agent 344 may also continue processing (also based on management parameters 301 and module 331) an existing information management job when communications to/from storage manager 340 fail. In such a case, media agent 344 may take over some of the messaging to/from the respective client that otherwise would involve the storage manager 340. Media agent may then complete the information management job autonomously, without requiring further instructions from the storage manager.

Furthermore, media agent 344 may serve any calls it receives from client A and may respond as if it were storage manager 340. Thus, status queries, information requests, timing parameters, etc. that client A might otherwise communicate to/from storage manager 340 may be served to client A by media agent 344. Data protection operations are therefore not compromised by the absence of communications with storage manager 340, and media agent 344 is able to "take over" one or more storage manager functions relative to client A. It should be noted that only a partial portion of primary data may be protected by any given information management job.

At step 4, media agent 344 executes the information management operation, e.g., processes the backup job, according to one or more management parameters in data structure 301, e.g., parameters of the storage policy and/or other relevant parameters, such as whether to compress the data, how to access the available storage media, etc. Accordingly, media agent 344 generates one or more secondary copies of client-A data 316, which are stored in secondary storage device(s) 308.

At step 5, which may occur substantially concurrently with step 4, media agent 344 generates metadata for the information management job being processed, based at least in part on logic provided by functional module 331. System-level metadata and other system-level information are recorded in data structure 431. Examples of system-level metadata include identifying the client/subclient and the data that was protected in the information management job; an association between a given job and the media agent that executed it; retention policy in regard to the protected data; the type of media required for certain types of jobs; job statistics, e.g., job size, job duration, error rates, job completion status, job progress, job pending reasons; the identity of the backed up client and particular subclient(s) and when the respective backup occurred; etc. The so-called system-level metadata may be configured (e.g., formatted, organized, structured, etc.) to be compatible with the management database 346 at the storage manager that will ultimately receive and integrate this information, e.g., synchronizing records 431 with management database 346. Thus, media agent 344 builds up a body of information in data structure 431 that is system-level compatible with, integratable by, and synchronizable with storage manager 340. This is advantageous, because it enables system 300 to operate in an integrated manner, having system-wide information and statistics, even if connectivity is problematic. Without the enhanced functionality, which comprises module 331, data structure 301, and data structure 431, media agent 344 would not be able to initiate, continue, and manager information management operations, thus leaving primary data 112 unprotected whenever communications to storage manager 340 were lost. Moreover, without robust system-level metadata collected during autonomous operations (e.g., collected in data structure 431), storage manager 340 would be left with incomplete information about key portions and/or operations of system 300.

Step 5 may also comprise other media agent operations, including generating and storing of job-specific metadata, e.g., which files were backed up, the particular secondary media to which they were stored (e.g., which version of a file is stored where), a content index, etc.; the job-specific metadata is stored in the media agent database 152 and/or index 153, as described in more detail above. The logical flow continues in the next figure.

Figure 5:
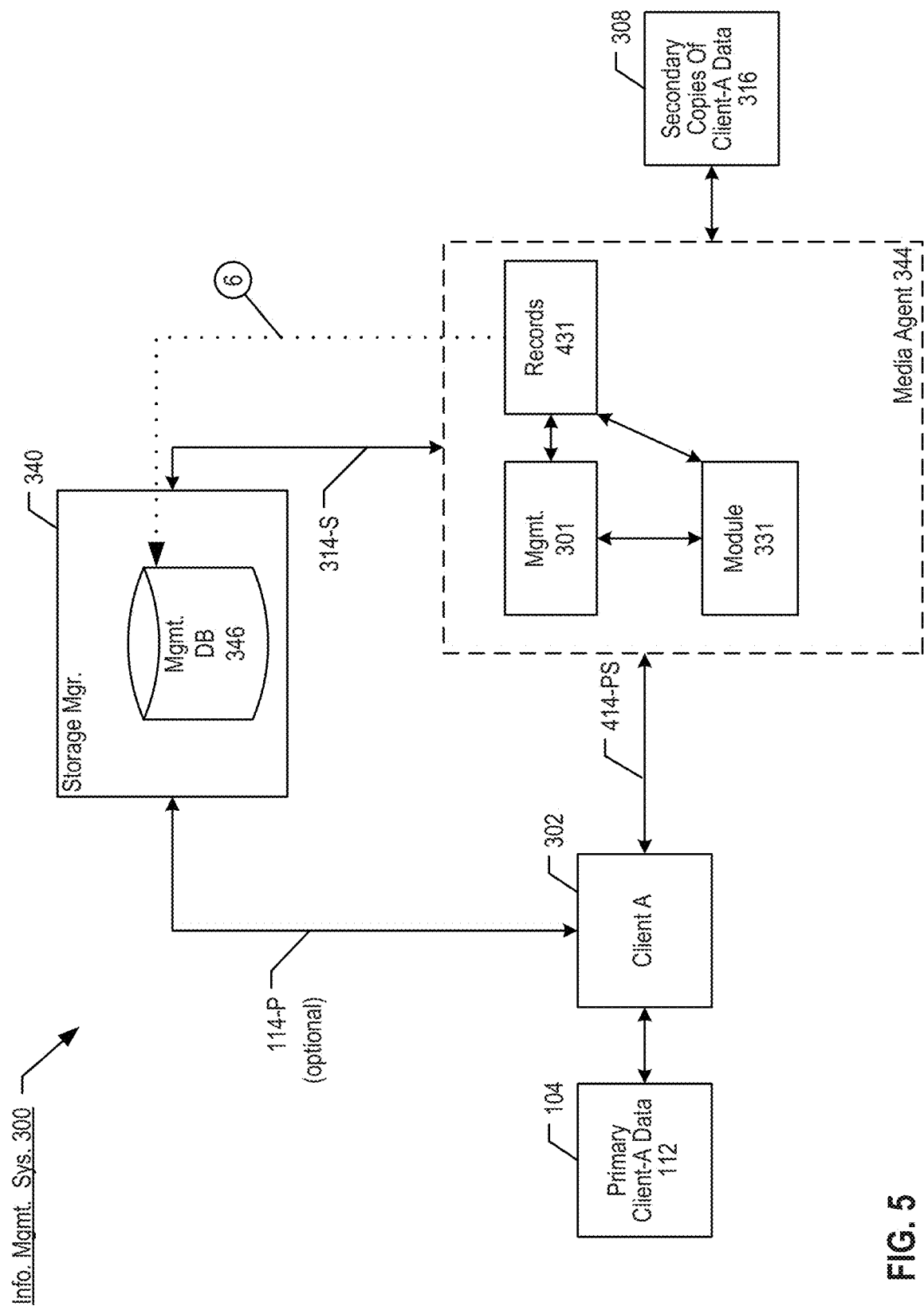
FIG. 5 is a block diagram depicting part of the logical flow begun in FIG. 3, which illustrates how commands and data flow through information management system 300 according to the illustrative embodiment.

FIG. 5 is a block diagram depicting part of the logical flow (dotted line, step 6) begun in FIG. 3, which illustrates how commands and data flow through information management system 300 according to the illustrative embodiment. Client A is shown in communication with storage manager 340 via optional communication path 114-P. Media agent 344 is shown in communication with storage manager 340 via communication path 314-S.

At step 6, communications to/from storage manager 340 have been restored. Media agent 344, based on executing module 331, transmits the information in data structure 431 (e.g., system-level metadata in whole or in part) to the storage manager. This may occur based upon module 331 detecting that communications to the storage manager have been restored, and initiating ("pushing") the information transfer thereto. In some embodiments, when communications are restored, the storage manager may request ("pull") updates from system components such as media agent 344; in such a case, in response to the request, media agent 344 transmits the information in data structure 431. In some embodiments, storage manager 340 may particularly identify media agent 344 as an "intelligent media agent" and request an update on that basis, and/or formulate the update request particularly to extract information from data structure 431.

After receiving the information 431 from media agent 344, storage manager 340 may analyze the information, and integrates the information into appropriate data structure(s) such as management database 346, e.g., synchronizing records 431 and management database 346. At this point, storage manager 340 can "see" information management status in reference to operations that occurred in the absence of communications with the storage manager.

In some embodiments, a direct communication path 114-P between client A and storage manager 340 is optional. In such embodiments, the association between client A and media agent 344 may be persistent, and communications between client A and storage manager 340 may be routed through the associated media agent 344, whether or not client A has a direct connection to storage manager 340.

After and/or concurrently with step 6, step 1 may resume, as described in reference to an earlier figure.

Figure 6:
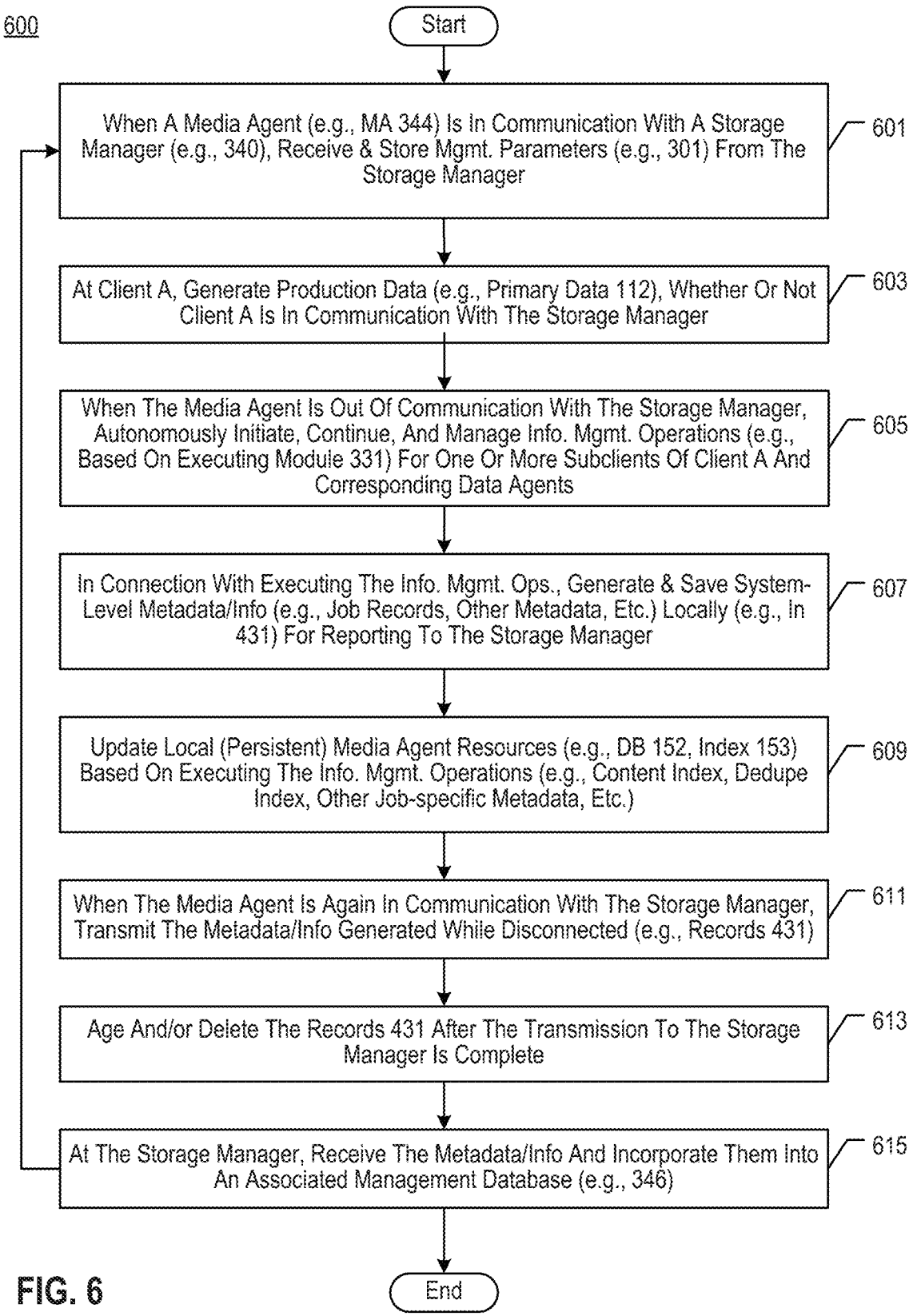
FIG. 6 depicts some salient operations of a method 600 according to an illustrative embodiment of the present invention.

FIG. 6 depicts some salient operations of a method 600 according to an illustrative embodiment of the present invention. Method 600 is performed by one or more components of information management system 300, principally by media agent 344 in substantially autonomous operation absent communications with storage manager 340. Some of the operations of method 600 correspond to one or more steps of the logical flow described in reference to the preceding figures.

At block 601, in information management system 300, when a media agent (e.g., media agent 344) is in communication with a storage manager that manages the information management system (e.g., storage manager 340), the media agent receives from the storage manager and stores one or more management parameters (e.g., in data structure 301). This operation roughly corresponds to step 1 described in reference to FIG. 3 above. As noted, this may be executed as a "pull" by the media agent, a "push" by the storage manager, administration of the media agent performed at a suitable time, and/or any combination thereof, without limitation.

At block 603, a client computing device (comprising client A) generates production data (e.g., primary client-A data 112), whether or not the client computing device is in communication with the storage manager. This operation roughly corresponds to step 2 described in reference to FIG. 4 above.

At block 605, when the media agent is out of communication with the storage manager, the media agent autonomously initiates, continues, and manages information management operations for one or more subclients and corresponding data agents. The autonomous operation of the media agent is based on executing module 331. These operations roughly correspond to steps 3 and 4 described in reference to FIG. 4 above.

At block 607, in connection with performing the above-mentioned information management operations, the media agent generates and saves system-level metadata and other information locally, e.g., in data structure 431, for reporting to the storage manager when communications are restored. This operation roughly corresponds to part of step 5 described in reference to FIG. 4 above.

At block 609, in connection with performing the above-mentioned information management operations, the media agent generates and saves job-specific metadata to local persistent resources, such as media agent database 152 and/or index cache 153. This operation roughly corresponds to part of step 5 described above in reference to FIG. 4.

At block 611, when the media agent is again in communication with the storage manager, the media agent transmits at least some of the information in data structure 431 (e.g., system-level metadata) to the storage manager. This operation roughly corresponds to part of step 6 described in reference to FIG. 5 above. As noted, this may be a "push" by the media agent to the storage manager or a "pull" by the storage manager upon restoration of communications therebetween.

At block 613, after the transmission to the storage manager is complete, the media agent may age and/or delete the information in data structure 431. The management parameters for conducting this operation, e.g., retention duration, timing, other conditions, etc., may be found illustratively in data structure 301.

At block 615, the storage manager receives the metadata/information transmitted by the media agent at block 611. The storage manager integrates the received metadata/information into an associated management database, e.g., database 346. This operation roughly corresponds to part of step 6 described above in reference to FIG. 5. At this point, control may pass again to block 601 or method 600 may end.

In regard to the steps, blocks, and/or operations described in reference to FIGS. 3-6 and method 600, other embodiments are possible within the scope of the present invention, such that the above-recited steps/blocks/operations are differently sequenced, sub-divided, organized, and/or combined. In some embodiments, a different component may initiate or execute a given operation. For example, in some embodiments media agent 344 is solely responsible for "pulling" management parameters 301 from storage manager 340 and for "pushing" metadata/information 431 to the storage manager, based on its own operational logic (e.g., module 331); in other embodiments, storage manager 340 may "push" management parameters 301 to one or more specially-identified media agents 344, for example.

Example Embodiments

An illustrative system may comprise:
a secondary storage device;
a secondary storage computing device in communication with (i) the secondary storage device and (ii) a client computing device, the secondary storage computing device comprising:
executable logic, and
management parameters received from a storage manager;
wherein, based at least in part on the executable logic and one or more of the management parameters, the secondary storage computing device is configured to initiate and manage, while out of communication with the storage manager, an information management job,
wherein the information management job is a secondary copy operation for a portion of primary data generated by the client computing device; and
wherein, based at least in part on the executable logic, the secondary storage computing device is further configured to transmit, to the storage manager, metadata that is based on the information management job.

The abovementioned system wherein the secondary storage computing device is further configured to initiate and manage the information management job while the client computing device is also out of communication with the storage manager. The abovementioned system wherein the metadata that is based on the information management job is configured for integration into a management database associated with the storage manager. The abovementioned system wherein the metadata that is based on the information management job identifies the client computing device and the portion of primary data managed under the information management job. The abovementioned system wherein to initiate and manage the information management job while out of communication with the storage manager, the secondary storage computing device is further configured to: instruct the client computing device to transmit the portion of primary data to the secondary storage computing device; generate at least one secondary copy based on the portion of primary data, store the at least one secondary copy in the secondary storage device, and generate the metadata. The abovementioned system wherein to initiate and manage the information management job while out of communication with the storage manager, the secondary storage computing device is further configured to: instruct the client computing device to transmit the portion of primary data to the secondary storage computing device, generate at least one secondary copy based on the portion of primary data, store the at least one secondary copy in the secondary storage device, and generate the metadata, wherein the metadata identifies the client computing device and the portion of primary data managed under the information management job. The abovementioned system wherein the management parameters received from the storage manager comprise a storage policy that defines criteria for the secondary copy operation for a subclient associated with the client computing device. The abovementioned system wherein the management parameters received from the storage manager comprise at least one storage policy associated with at least some primary data generated by the client computing device. The abovementioned system wherein the management parameters received from the storage manager comprise at least one storage policy, and wherein the information management job is based on the storage policy. The abovementioned system wherein the metadata transmitted to the storage manager comprises an association between the information management job and the secondary storage computing device. The abovementioned system wherein the metadata transmitted to the storage manager comprises an association between the information management job and a media agent that executes on the secondary storage computing device.

The abovementioned system may further comprise the storage manager, wherein the storage manager is configured to integrate the metadata received from the secondary storage computing device into a management database. The abovementioned system may further comprise the storage manager, wherein the storage manager is configured to integrate into a management database an association between the information management job and the secondary storage computing device. The abovementioned system may further comprise the storage manager, wherein the storage manager is configured to integrate into a management database an association between the information management job and a media agent that executes on the secondary storage computing device. The abovementioned system may further comprise the storage manager, wherein the storage manager is configured to integrate into a management database the metadata received from the secondary storage computing device, wherein the metadata identifies the client computing device and the portion of primary data managed under the information management job.

An illustrative information management system may comprise:
  a storage manager that manages the information management system;
  a secondary storage device;
  a secondary storage computing device in communication with (i) the secondary storage device and (ii) a client computing device, the secondary storage computing device comprising:
    executable logic, and
    management parameters received from a storage manager;
    wherein, based at least in part on the executable logic and one or more of the management parameters, the secondary storage computing device is configured to initiate and manage, while one or both of the secondary storage computing device and the client computing device are out of communication with the storage manager, an information management job to protect a portion of primary data generated by the client computing device;
    wherein, based at least in part on the executable logic, the secondary storage computing device is further configured to transmit, to the storage manager, metadata that is based on the information management job.

The abovementioned information management system, wherein the storage manager is configured to integrate the metadata received from the secondary storage computing device into a management database. The abovementioned information management system, wherein the information management job is a secondary copy operation for the portion of primary data generated by the client computing device. The abovementioned information management system, wherein the management parameters received from the storage manager comprise at least one storage policy, and wherein the information management job is based on the storage policy. The abovementioned information management system, wherein the metadata identifies the portion of primary data protected by the information management job. The abovementioned information management system, wherein to initiate and manage the information management job while out of communication with the storage manager, the secondary storage computing device is further configured to: instruct the client computing device to transmit the portion of primary data to the secondary storage computing device, generate at least one secondary copy based on the portion of primary data, store the at least one secondary copy in the secondary storage device, and generate the metadata.

An illustrative method may comprise:
  generating primary data by a client computing device, wherein the client computing device is a component of an information management system managed by a storage manager; and
  initiating and managing, by a secondary storage computing device, while out of communication with the storage manager, an information management job to protect a portion of the primary data,
    wherein the initiating and managing are based on an information management policy previously received by the secondary storage computing device from the storage manager, and
    wherein the initiating and managing, by the secondary storage computing device, comprises:
      instructing the client computing device to transmit the portion of primary data to the secondary storage computing device;
      generating at least one secondary copy based on the portion of primary data,
      storing the at least one secondary copy in one or more secondary storage devices in communication with the secondary storage computing device, and
      generating metadata comprising information about the information management job.

The abovementioned method, wherein initiating and managing occurs while the client computing device is also out of communication with the storage manager. The abovementioned method, wherein the information management policy is included in one or more management parameters requested by the secondary storage computing device from the storage manager.

In the abovementioned method, the information management policy is included in one or more management parameters in a transmission, from the storage manager to the secondary storage computing device, initiated by the storage manager. The abovementioned method, wherein the initiating and managing further comprises configuring the metadata for integration, by the storage manager, in a management database. The abovementioned method, may further comprise: transmitting, by the secondary storage computing device to the storage manager, the metadata, wherein the metadata is configured for integration, by the storage manager, into a management database. The abovementioned method, may further comprise: integrating, by the storage manager, the metadata received from the secondary storage computing device, into a management database.

Another illustrative method may comprise:

generating primary data by a client computing device, wherein the client computing device is a component of an information management system managed by a storage manager; and receiving, by a secondary storage computing device, an information management policy for a portion of the primary data generated by the client computing device;

while out of communication with the storage manager, initiating and managing, by the secondary storage computing device, an information management job based on the information management policy; and transmitting, by the secondary storage computing device, to the storage manager, metadata generated by the secondary storage computing device while managing the information management job, wherein the metadata identifies the client computing device and the portion of primary data managed under the information management job.

The abovementioned method, wherein the metadata generated by the secondary storage computing device while managing the information management job is configured for integration, by the storage manager, into a management database. The abovementioned method, may further comprise: integrating, by the storage manager, the metadata received from the secondary storage computing device, into a management database associated with the storage manager. The abovementioned method, wherein the information management policy is included in one or more management parameters requested by the secondary storage computing device from the storage manager. The abovementioned method, wherein the information management policy is included in one or more management parameters transmitted by the storage manager to the secondary storage computing device in anticipation of a loss of communications between the storage manager and the secondary storage computing device.

Yet another illustrative method may comprise:

transmitting, by a storage manager that manages an information management system based at least in part on an associated management database, to a secondary storage computing device that is a component of the information management system, one or more management parameters,
  wherein the secondary storage computing device comprises executable logic for initiating and managing, while out of communication with the storage manager, one or more information management jobs based on the one or more management parameters; and receiving, by the storage manager, from the secondary storage computing device, metadata generated by the secondary storage computing device based on the one or more information management jobs; and integrating the received metadata, by the storage manager, into the associated management database.

The abovementioned method, wherein the one or more management parameters are transmitted by the storage manager in response to a request from the secondary storage computing device. The abovementioned method, wherein the transmitting of the one or more management parameters is initiated by the storage manager. The abovementioned method, may further comprise: initiating and managing, by the secondary storage computing device while out of communication with the storage manager, based on executing the executable logic, an information management job relative to a portion of primary data generated by a client computing device, wherein the client computing device is also out of communication with the storage manager, and further wherein the client computing device is also a component of the information management system.

An illustrative computer-readable medium, excluding transitory propagating signals, storing instructions that, when executed by at least one secondary storage computing device, cause the secondary storage computing device to perform operations may comprise:

initiating and managing, while out of communication with a storage manager, an information management job to protect a portion of primary data that is generated by a client computing device,
  wherein the initiating and managing are based on an information management policy previously received by the secondary storage computing device from the storage manager, and
  wherein the initiating and managing, by the secondary storage computing device, comprises:
    instructing the client computing device to transmit the portion of primary data to the secondary storage computing device;
    generating at least one secondary copy based on the portion of primary data,
    storing the at least one secondary copy in one or more secondary storage devices in communication with the secondary storage computing device, and
    generating metadata comprising information about the information management job.

Another illustrative computer-readable medium, excluding transitory propagating signals, storing instructions that, when executed by at least one secondary storage computing device, cause the secondary storage computing device to perform operations may comprise:

receiving an information management policy for a portion of primary data generated by a client computing device, wherein the client computing device is a component of an information management system managed by a storage manager;

while out of communication with the storage manager, initiating and managing, by the secondary storage computing device, an information management job based on the information management policy; and transmitting, by the secondary storage computing device, to the storage manager, metadata generated by the secondary storage computing device while managing the information management job, wherein the metadata identifies the client computing device and the portion of primary data managed under the information management job.

Another illustrative computer-readable medium, excluding transitory propagating signals, storing instructions that, when executed by at least one storage manager that manages an information management system based at least in part on an associated management database, cause the storage manager to perform operations comprising:

transmitting to a secondary storage computing device that is a component of the information management system, one or more management parameters,
  wherein the secondary storage computing device comprises executable logic for initiating and managing, while out of communication with the storage manager, one or more information management jobs based on the one or more management parameters; and receiving, by the storage manager, from the secondary storage computing device, metadata generated by the secondary storage computing device based on the one or more information management jobs; and integrating the received metadata, by the storage manager, into the associated management database.

Another illustrative system may comprise:

a storage manager that manages an information management system based at least in part on an associated management database, wherein the storage manager is configured to:
- transmit to a secondary storage computing device that is a component of the information management system, one or more management parameters for an intelligent media agent that executes on the secondary storage computing device, wherein the management parameters enable the intelligent media agent to execute one or more information management jobs, based at least in part on the one or more management parameters, when the secondary storage computing device is out of communication with the storage manager,
- receive from the secondary storage computing device, metadata generated by the secondary storage computing device based on the one or more information management jobs; and
- integrate the received metadata into the associated management database.

The abovementioned system wherein the received metadata is in reference to an information management job that (i) began while the storage manager and the secondary storage computing device were in communication with each other, and (ii) continued and was completed after the storage manager and the secondary storage computing device were no longer in communication with each other. The abovementioned system wherein the received metadata is in reference to an information management job that began after the storage manager and the secondary storage computing device were no longer in communication with each other.

Another illustrative system may comprise:

a secondary storage device;

a secondary storage computing device in communication with (i) the secondary storage device and (ii) a client computing device, the secondary storage computing device comprising:
- executable logic, and
- management parameters received from a storage manager;

wherein, based at least in part on the executable logic and one or more of the management parameters, the secondary storage computing device is configured to continue processing, while out of communication with the storage manager, an information management job begun while the secondary storage computing device was in communication with the storage manager,
- wherein the information management job is a secondary copy operation for a portion of primary data generated by the client computing device; and wherein, based at least in part on the executable logic, the secondary storage computing device is further configured to transmit, to the storage manager, metadata that is based on the information management job.

Another illustrative information management system may comprise:

a storage manager that manages the information management system;

a secondary storage device;

a secondary storage computing device in communication with (i) the secondary storage device and (ii) a client computing device, the secondary storage computing device comprising:
- executable logic, and
- management parameters received from a storage manager;

wherein, based at least in part on the executable logic and one or more of the management parameters, the secondary storage computing device is configured to continue processing, while one or both of the secondary storage computing device and the client computing device are out of communication with the storage manager, an information management job to protect a portion of primary data generated by the client computing device, wherein the information management job was begun while the secondary storage computing device was in communication with the storage manager;

wherein, based at least in part on the executable logic, the secondary storage computing device is further configured to transmit, to the storage manager, metadata that is based on the information management job.

Another exemplary method may comprise:

generating primary data by a client computing device, wherein the client computing device is a component of an information management system managed by a storage manager;

initiating and managing, by the storage manager, an information management job to protect a portion of the primary data generated by the client computing device, wherein the job is processed by a secondary storage computing device; and continuing, by the secondary storage computing device, while out of communication with the storage manager, to process the information management job,
- wherein the continuing to process is based on management parameters previously received by the secondary storage computing device from the storage manager, and
- wherein the continuing to process, by the secondary storage computing device, comprises:
  - generating at least one secondary copy based on the portion of primary data,
  - storing the at least one secondary copy in one or more secondary storage devices in communication with the secondary storage computing device, and
  - generating metadata comprising information about the information management job.

The abovementioned method, wherein the continuing to process occurs while the client computing device is also out of communication with the storage manager. Many other embodiments are also possible, including any number of combinations of the illustrative systems, methods, and computer-readable media recited herein.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:
identifying, by a storage manager executing on a computing device comprising one or more processors and computer memory, wherein the storage manager manages storage operations in an information management system without assistance from other storage managers,
a first computing device, which is a component of the information management system, and which comprises one or more processors, computer memory, and executable logic for autonomously managing storage operations in the information management system on behalf of the storage manager when the first computing device is out of communication with the storage manager;
transmitting, by the storage manager to the first computing device,
one or more management parameters for autonomously managing the storage operations when the first computing device is out of communication with the storage manager;
after communications between the first computing device and the storage manager resume,
receiving, by the storage manager, from the first computing device, metadata generated by the first computing device based on the storage operations that were autonomously managed by the first computing device while out of communication with the storage manager; and
integrating the metadata, by the storage manager, into a management database associated with the storage manager.

2. The method of claim 1 wherein a media agent comprises the executable logic and executes on the first computing device.

3. The method of claim 1 wherein a media agent comprises the executable logic and executes on the first computing device, and
further wherein the storage manager identifies the media agent as a component of the information management system that is capable of autonomously managing the storage operations in the information management system on behalf of the storage manager when the first computing device is out of communication with the storage manager.

4. The method of claim 1 wherein the one or more management parameters are transmitted by the storage manager in response to one or more requests received from the first computing device.

5. The method of claim 1 wherein the transmitting of the one or more management parameters to the first computing device is initiated by the storage manager.

6. The method of claim 1 wherein the one or more management parameters comprise a storage policy that applies to at least one client computing device, which is a component of the information management system, and which generates primary data involved in at least one of the storage operations.

7. The method of claim 1 further comprising:
while out of communication with the storage manager, initiating and managing by the first computing device, based on the one or more management parameters, one or more storage operations on a portion of a primary data generated by a client computing device that is a component of the information management system.

8. The method of claim 7 wherein the metadata received from the first computing device identifies the client computing device and the portion of the primary data subjected to the one or more storage operations manacled by the first computing device.

9. The method of claim 1 wherein integrating by the storage manager further comprises adding to the management database an association between the storage operations and the first computing device that autonomously managed the storage operations while out of communication with the storage manager.

10. The method of claim 1 wherein integrating by the storage manager further comprises adding to the management database an association between the storage operations and a media agent that executes on the first computing device, and wherein the media agent comprises the executable logic.

11. The method of claim 1 wherein the metadata received from the first computing device is in reference to at least one storage operation that (i) began while the storage manager was in communication with the first computing device, and (ii) continued after the storage manager was out of communication with the first computing device, and (iii) while the storage manager was out of communication with the first computing device was completed autonomously by the first computing device without further instructions from the storage manager or from another storage manager.

12. The method of claim 1 further comprising:
determining, by the storage manager, which one or more client and sub-client components of the information management system to subject to the storage operations that are to be autonomously managed by the first computing device while out of communication with the storage manager and according to the one or more management parameters.

13. The method of claim 1 further comprising:
determining, by the storage manager, which storage operations are to be autonomously managed by the first computing device while out of communication with the storage manager.

14. A computer-implemented method comprising:
generating primary data by a client computing device, wherein the client computing device is a component of an information management system managed by a storage manager without assistance from other storage managers;
while in communication with a first computing device, by the storage manager: (i) initiating one or more storage operations on the primary data generated by the client computing device, wherein the one or more storage operations are processed at least in part by the first computing device, and (ii) transmitting management parameters to the first computing device that enable the first computing device to continue the one or more storage operations without further instructions from the storage manager;
while out of communication with the storage manager, continuing by the first computing device to process the one or more storage operations based on one or more of the management parameters previously received from the storage manager; and
wherein the continuing to process the one or more storage operations by the first computing device comprises:
generating at least one secondary copy based on the primary data, storing the at least one secondary copy to one or more storage devices in communication with the first computing device, and generating metadata comprising information about the at least one secondary copy and information about the one or more storage operations performed while out of communication with the storage manager; and wherein the storage manager comprises one or more computer processors and computer memory, wherein the client computing device comprises one or more computer processors and computer memory, and wherein the first computing device comprises one or more computer processors and computer memory.

15. The method of claim 14 further comprising:

determining, by the storage manager, which one of the one or more storage operations are to be autonomously managed by the first computing device while out of communication with the storage manager.

16. The method of claim 14 further comprising:

after communications with the first computing device resume, receiving by the storage manager from the first computing device at least some of the metadata generated by the first computing device while out of communication with the storage manager; and integrating the at least some of the metadata, received by the storage manager, into a management database.

17. The method of claim 14 wherein the first computing device executes a media agent that comprises executable logic for autonomously managing storage operations in the information management system on behalf of the storage manager when the first computing device is out of communication with the storage manager.

18. The method of claim 14 further comprising: while out of communication with the storage manager, receiving the primary data from the client computing device by the first computing device and processing the primary data from the client computing device by a media agent on the first computing device.

19. The method of claim 14 wherein transmitting of the management parameters to the first computing device is initiated by the storage manager.

20. The method of claim 14 wherein the management parameters comprise a storage policy that applies to at least some of the primary data generated by the client computing device.

* * * * *